United States Patent [19]

Warner et al.

[11] 4,243,976

[45] Jan. 6, 1981

[54] TERNARY TO BINARY CONVERTER

[75] Inventors: Richard C. Warner, Morris Plains; Donald J. Weber, North Caldwell, both of N.J.

[73] Assignee: The Singer Company, Little Falls, N.J.

[21] Appl. No.: 19,545

[22] Filed: Mar. 12, 1979

[51] Int. Cl.² ........................................... H03K 13/24
[52] U.S. Cl. ............................................. 340/347 DD
[58] Field of Search ................ 340/347 DD; 250/199; 375/38 A; 178/66, 67, 68

[56] References Cited

U.S. PATENT DOCUMENTS

| | | | |
|---|---|---|---|
| 3,611,141 | 10/1971 | Waters | 340/347 DD |
| 3,866,147 | 2/1975 | De Couveur et al. | 332/11 R |
| 4,092,595 | 5/1978 | Weir | 325/38 A |
| 4,097,859 | 6/1978 | Looschen | 340/347 DD |

Primary Examiner—Charles D. Miller
Attorney, Agent, or Firm—John C. Altmiller; T. W. Kennedy

[57] ABSTRACT

A device for converting ternary-coded electrical pulse trains into binary-coded pulse trains, by interrupting a binary zero-rate data stream, representing one ternary condition, to supply an output voltage or no output voltage, representing the other ternary conditions.

5 Claims, 21 Drawing Figures

FIG. 3

| CONTROL INPUTS TO MULTIPLEXER INTERNAL | | | | | | | OUTPUTS FROM MULTIPLEXER | | OUTPUTS FROM FLIP-FLOPS | | |
|---|---|---|---|---|---|---|---|---|---|---|---|
| $-\omega_T$ | $+\omega_T$ | $P_{ST}$ | $\overline{P_{ST}}$ | 5V. | OV. | NS | $\overline{N\omega_B}$ | $P_{ST+1}$ | $\overline{P_{ST+1}}$ | $\omega_B$ | |
| SB | SA | 2C0 2C3 | IC2 2C2 | IC3 | IC0 IC1 2C1 | 1Y | 2Y | ZERO RATE FLIP-FLOP | | (CURRENT FLIP-FLOP) | SIGNAL TERMINAL → |
| 1 | 0 | 1 | 0 | 1 | 0 | 0 | 0 | 0 | 1 | 1 | |
| 1 | 0 | 0 | 1 | 1 | 0 | 1 | 1 | 1 | 0 | 0 | |
| 0 | 0 | 1 | 0 | 1 | 0 | 1 | 0 | 1 | 0 | 1 | |
| 0 | 0 | 0 | 1 | 1 | 0 | 0 | 0 | 0 | 1 | 1 | |
| 1 | 1 | 1 | 0 | 1 | 0 | 0 | 1 | 1 | 0 | 0 | |
| 1 | 1 | 0 | 1 | 1 | 0 | 0 | 1 | 0 | 1 | 0 | |

| | TERNARY CONDITIONS | | |
|---|---|---|---|
| | NO INPUT 0 | $+\omega_T$ INPUT | $-\omega_T$ INPUT |
| TWO LINE INPUT $\{$ $+\omega_X$ | 1 | 0 | 0 |
| $-\omega_X$ | 0 | 0 | 1 |
| SINGLE LINE OUTPUT $\{$ $Q_2(A_2)$ | 1 \| 0 | 1 \| 0 | 0 \| 1 |
| $\omega_{XB}$ | 0 \| 1 | 1 \| 1 | 0 \| 0 |

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 0 | 0 | 0 | 0 | 0 | 0 | 0 | 0 | x | x | 0 | 1 | 0 | 1 | 0 | 1 |
| 0 | 0 | 0 | 0 | 0 | 0 | 0 | 0 | 1 | x | x | 0 | 1 | 0 | 1 | 1 | 0 |
| 0 | 0 | 0 | 0 | 0 | 0 | 0 | 1 | 0 | x | x | 0 | 1 | 0 | 1 | 0 | 0 |
| 0 | 0 | 0 | 0 | 0 | 0 | 0 | 1 | 1 | x | x | x | x | x | x | x | x |
| 0 | 0 | 0 | 0 | 0 | 0 | 1 | 0 | 0 | x | x | 0 | 1 | 0 | 1 | 1 | 1 |
| 0 | 0 | 0 | 0 | 0 | 0 | 1 | 0 | 1 | x | x | 0 | 1 | 0 | 1 | 0 | 1 |
| 0 | 0 | 0 | 0 | 0 | 0 | 1 | 1 | 0 | x | x | 0 | 1 | 0 | 1 | 1 | 0 |
| 0 | 0 | 0 | 0 | 0 | 0 | 1 | 1 | 1 | x | x | x | x | x | x | x | x |
| 0 | 0 | 0 | 0 | 0 | 1 | 0 | 0 | 0 | x | x | 0 | 1 | 1 | 0 | 0 | 1 |
| 0 | 0 | 0 | 0 | 0 | 1 | 0 | 0 | 1 | x | x | 0 | 1 | 1 | 0 | 1 | 0 |
| 0 | 0 | 0 | 0 | 0 | 1 | 0 | 1 | 0 | x | x | 0 | 1 | 1 | 0 | 0 | 0 |
| 0 | 0 | 0 | 0 | 0 | 1 | 0 | 1 | 1 | x | x | x | x | x | x | x | x |
| 0 | 0 | 0 | 0 | 0 | 1 | 1 | 0 | 0 | x | x | 0 | 1 | 1 | 0 | 1 | 1 |
| 0 | 0 | 0 | 0 | 0 | 1 | 1 | 0 | 1 | x | x | 0 | 1 | 1 | 0 | 0 | 1 |
| 0 | 0 | 0 | 0 | 0 | 1 | 1 | 1 | 0 | x | x | 0 | 1 | 1 | 0 | 1 | 0 |
| 0 | 0 | 0 | 0 | 0 | 1 | 1 | 1 | 1 | x | x | x | x | x | x | x | x |
| 0 | 0 | 0 | 0 | 1 | 0 | 0 | 0 | 0 | x | x | 0 | 1 | 0 | 0 | 0 | 1 |
| 0 | 0 | 0 | 0 | 1 | 0 | 0 | 0 | 1 | x | x | 0 | 1 | 0 | 0 | 1 | 0 |
| 0 | 0 | 0 | 0 | 1 | 0 | 0 | 1 | 0 | x | x | 0 | 1 | 0 | 0 | 0 | 0 |
| 0 | 0 | 0 | 0 | 1 | 0 | 0 | 1 | 1 | x | x | x | x | x | x | x | x |
| 0 | 0 | 0 | 0 | 1 | 0 | 1 | 0 | 0 | x | x | 0 | 1 | 0 | 0 | 1 | 1 |
| 0 | 0 | 0 | 0 | 1 | 0 | 1 | 0 | 1 | x | x | 0 | 1 | 0 | 0 | 0 | 1 |
| 0 | 0 | 0 | 0 | 1 | 0 | 1 | 1 | 0 | x | x | 0 | 1 | 0 | 0 | 1 | 0 |
| 0 | 0 | 0 | 0 | 1 | 0 | 1 | 1 | 1 | x | x | x | x | x | x | x | x |
| 0 | 0 | 0 | 0 | 1 | 1 | 0 | 0 | 0 | x | x | x | x | x | x | x | x |
| 0 | 0 | 0 | 0 | 1 | 1 | 0 | 0 | 1 | x | x | x | x | x | x | x | x |
| 0 | 0 | 0 | 0 | 1 | 1 | 0 | 1 | 0 | x | x | x | x | x | x | x | x |
| 0 | 0 | 0 | 0 | 1 | 1 | 0 | 1 | 1 | x | x | x | x | x | x | x | x |
| 0 | 0 | 0 | 0 | 1 | 1 | 1 | 0 | 0 | x | x | x | x | x | x | x | x |
| 0 | 0 | 0 | 0 | 1 | 1 | 1 | 0 | 1 | x | x | x | x | x | x | x | x |
| 0 | 0 | 0 | 0 | 1 | 1 | 1 | 1 | 0 | x | x | x | x | x | x | x | x |
| 0 | 0 | 0 | 0 | 1 | 1 | 1 | 1 | 1 | x | x | x | x | x | x | x | x |

FIG. 6

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 0 | 0 | 1 | 0 | 0 | 0 | 0 | 0 | x | x | 0 | 1 | 1 | 1 | 0 | 1 |
| 0 | 0 | 0 | 1 | 0 | 0 | 0 | 0 | 1 | x | x | 0 | 1 | 1 | 1 | 1 | 0 |
| 0 | 0 | 0 | 1 | 0 | 0 | 0 | 1 | 0 | x | x | 0 | 1 | 1 | 1 | 0 | 0 |
| 0 | 0 | 0 | 1 | 0 | 0 | 0 | 1 | 1 | x | x | x | x | x | x | x | x |
| 0 | 0 | 0 | 1 | 0 | 0 | 1 | 0 | 0 | x | x | 0 | 1 | 1 | 1 | 1 | 1 |
| 0 | 0 | 0 | 1 | 0 | 0 | 1 | 0 | 1 | x | x | 0 | 1 | 1 | 1 | 0 | 1 |
| 0 | 0 | 0 | 1 | 0 | 0 | 1 | 1 | 0 | x | x | 0 | 1 | 1 | 1 | 1 | 0 |
| 0 | 0 | 0 | 1 | 0 | 0 | 1 | 1 | 1 | x | x | x | x | x | x | x | x |
| 0 | 0 | 0 | 1 | 0 | 1 | 0 | 0 | 0 | x | x | 0 | 1 | 0 | 1 | 0 | 1 |
| 0 | 0 | 0 | 1 | 0 | 1 | 0 | 0 | 1 | x | x | 0 | 1 | 0 | 1 | 1 | 0 |
| 0 | 0 | 0 | 1 | 0 | 1 | 0 | 1 | 0 | x | x | 0 | 1 | 0 | 1 | 0 | 0 |
| 0 | 0 | 0 | 1 | 0 | 1 | 0 | 1 | 1 | x | x | x | x | x | x | x | x |
| 0 | 0 | 0 | 1 | 0 | 1 | 1 | 0 | 0 | x | x | 0 | 1 | 0 | 1 | 1 | 1 |
| 0 | 0 | 0 | 1 | 0 | 1 | 1 | 0 | 1 | x | x | 0 | 1 | 0 | 1 | 0 | 1 |
| 0 | 0 | 0 | 1 | 0 | 1 | 1 | 1 | 0 | x | x | 0 | 1 | 0 | 1 | 1 | 0 |
| 0 | 0 | 0 | 1 | 0 | 1 | 1 | 1 | 1 | x | x | x | x | x | x | x | x |
| 0 | 0 | 0 | 1 | 1 | 0 | 0 | 0 | 0 | x | x | 0 | 1 | 1 | 0 | 0 | 1 |
| 0 | 0 | 0 | 1 | 1 | 0 | 0 | 0 | 1 | x | x | 0 | 1 | 1 | 0 | 1 | 0 |
| 0 | 0 | 0 | 1 | 1 | 0 | 0 | 1 | 0 | x | x | 0 | 1 | 1 | 0 | 0 | 0 |
| 0 | 0 | 0 | 1 | 1 | 0 | 0 | 1 | 1 | x | x | x | x | x | x | x | x |
| 0 | 0 | 0 | 1 | 1 | 0 | 1 | 0 | 0 | x | x | 0 | 1 | 1 | 0 | 1 | 1 |
| 0 | 0 | 0 | 1 | 1 | 0 | 1 | 0 | 1 | x | x | 0 | 1 | 1 | 0 | 0 | 1 |
| 0 | 0 | 0 | 1 | 1 | 0 | 1 | 1 | 0 | x | x | 0 | 1 | 1 | 0 | 1 | 0 |
| 0 | 0 | 0 | 1 | 1 | 0 | 1 | 1 | 1 | x | x | x | x | x | x | x | x |
| 0 | 0 | 0 | 1 | 1 | 1 | 0 | 0 | 0 | x | x | x | x | x | x | x | x |
| 0 | 0 | 0 | 1 | 1 | 1 | 0 | 0 | 1 | x | x | x | x | x | x | x | x |
| 0 | 0 | 0 | 1 | 1 | 1 | 0 | 1 | 0 | x | x | x | x | x | x | x | x |
| 0 | 0 | 0 | 1 | 1 | 1 | 0 | 1 | 1 | x | x | x | x | x | x | x | x |
| 0 | 0 | 0 | 1 | 1 | 1 | 1 | 0 | 0 | x | x | x | x | x | x | x | x |
| 0 | 0 | 0 | 1 | 1 | 1 | 1 | 0 | 1 | x | x | x | x | x | x | x | x |
| 0 | 0 | 0 | 1 | 1 | 1 | 1 | 1 | 0 | x | x | x | x | x | x | x | x |
| 0 | 0 | 0 | 1 | 1 | 1 | 1 | 1 | 1 | x | x | x | x | x | x | x | x |

FIG. 7

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 0 | 1 | 0 | 0 | 0 | 0 | 0 | 0 | x | x | 1 | 0 | 0 | 1 | 0 | 1 |
| 0 | 0 | 1 | 0 | 0 | 0 | 0 | 0 | 1 | x | x | 1 | 0 | 0 | 1 | 1 | 0 |
| 0 | 0 | 1 | 0 | 0 | 0 | 0 | 1 | 0 | x | x | 1 | 0 | 0 | 1 | 0 | 0 |
| 0 | 0 | 1 | 0 | 0 | 0 | 0 | 1 | 1 | x | x | x | x | x | x | x | x |
| 0 | 0 | 1 | 0 | 0 | 0 | 1 | 0 | 0 | x | x | 1 | 0 | 0 | 1 | 1 | 1 |
| 0 | 0 | 1 | 0 | 0 | 0 | 1 | 0 | 1 | x | x | 1 | 0 | 0 | 1 | 0 | 1 |
| 0 | 0 | 1 | 0 | 0 | 0 | 1 | 1 | 0 | x | x | 1 | 0 | 0 | 1 | 1 | 0 |
| 0 | 0 | 1 | 0 | 0 | 0 | 1 | 1 | 1 | x | x | x | x | x | x | x | x |
| 0 | 0 | 1 | 0 | 0 | 1 | 0 | 0 | 0 | x | x | 1 | 0 | 1 | 0 | 0 | 1 |
| 0 | 0 | 1 | 0 | 0 | 1 | 0 | 0 | 1 | x | x | 1 | 0 | 1 | 0 | 1 | 0 |
| 0 | 0 | 1 | 0 | 0 | 1 | 0 | 1 | 0 | x | x | 1 | 0 | 1 | 0 | 0 | 0 |
| 0 | 0 | 1 | 0 | 0 | 1 | 0 | 1 | 1 | x | x | x | x | x | x | x | x |
| 0 | 0 | 1 | 0 | 0 | 1 | 1 | 0 | 0 | x | x | 1 | 0 | 1 | 0 | 1 | 1 |
| 0 | 0 | 1 | 0 | 0 | 1 | 1 | 0 | 1 | x | x | 1 | 0 | 1 | 0 | 0 | 1 |
| 0 | 0 | 1 | 0 | 0 | 1 | 1 | 1 | 0 | x | x | 1 | 0 | 1 | 0 | 1 | 0 |
| 0 | 0 | 1 | 0 | 0 | 1 | 1 | 1 | 1 | x | x | x | x | x | x | x | x |
| 0 | 0 | 1 | 0 | 1 | 0 | 0 | 0 | 0 | x | x | 1 | 0 | 0 | 0 | 0 | 1 |
| 0 | 0 | 1 | 0 | 1 | 0 | 0 | 0 | 1 | x | x | 1 | 0 | 0 | 0 | 1 | 0 |
| 0 | 0 | 1 | 0 | 1 | 0 | 0 | 1 | 0 | x | x | 1 | 0 | 0 | 0 | 0 | 0 |
| 0 | 0 | 1 | 0 | 1 | 0 | 0 | 1 | 1 | x | x | x | x | x | x | x | x |
| 0 | 0 | 1 | 0 | 1 | 0 | 1 | 0 | 0 | x | x | 1 | 0 | 0 | 0 | 1 | 1 |
| 0 | 0 | 1 | 0 | 1 | 0 | 1 | 0 | 1 | x | x | 1 | 0 | 0 | 0 | 0 | 1 |
| 0 | 0 | 1 | 0 | 1 | 0 | 1 | 1 | 0 | x | x | 1 | 0 | 0 | 0 | 1 | 0 |
| 0 | 0 | 1 | 0 | 1 | 0 | 1 | 1 | 1 | x | x | x | x | x | x | x | x |
| 0 | 0 | 1 | 0 | 1 | 1 | 0 | 0 | 0 | x | x | x | x | x | x | x | x |
| 0 | 0 | 1 | 0 | 1 | 1 | 0 | 0 | 1 | x | x | x | x | x | x | x | x |
| 0 | 0 | 1 | 0 | 1 | 1 | 0 | 1 | 0 | x | x | x | x | x | x | x | x |
| 0 | 0 | 1 | 0 | 1 | 1 | 0 | 1 | 1 | x | x | x | x | x | x | x | x |
| 0 | 0 | 1 | 0 | 1 | 1 | 1 | 0 | 0 | x | x | x | x | x | x | x | x |
| 0 | 0 | 1 | 0 | 1 | 1 | 1 | 0 | 1 | x | x | x | x | x | x | x | x |
| 0 | 0 | 1 | 0 | 1 | 1 | 1 | 1 | 0 | x | x | x | x | x | x | x | x |
| 0 | 0 | 1 | 0 | 1 | 1 | 1 | 1 | 1 | x | x | x | x | x | x | x | x |

*FIG.8*

| A8 | A7 | A6 | A5 | A4 | A3 | A2 | A1 | A0 | Q8 | Q7 | Q6 | Q5 | Q4 | Q3 | Q2 | Q1 |
|---|---|---|---|---|---|---|---|---|---|---|---|---|---|---|---|---|
| 0 | 0 | 1 | 1 | 0 | 0 | 0 | 0 | 0 | x | x | 1 | 0 | 1 | 1 | 0 | 1 |
| 0 | 0 | 1 | 1 | 0 | 0 | 0 | 0 | 1 | x | x | 1 | 0 | 1 | 1 | 1 | 0 |
| 0 | 0 | 1 | 1 | 0 | 0 | 0 | 1 | 0 | x | x | 1 | 0 | 1 | 1 | 0 | 0 |
| 0 | 0 | 1 | 1 | 0 | 0 | 0 | 1 | 1 | x | x | x | x | x | x | x | x |
| 0 | 0 | 1 | 1 | 0 | 0 | 1 | 0 | 0 | x | x | 1 | 0 | 1 | 1 | 1 | 1 |
| 0 | 0 | 1 | 1 | 0 | 0 | 1 | 0 | 1 | x | x | 1 | 0 | 1 | 1 | 0 | 1 |
| 0 | 0 | 1 | 1 | 0 | 0 | 1 | 1 | 0 | x | x | 1 | 0 | 1 | 1 | 1 | 0 |
| 0 | 0 | 1 | 1 | 0 | 0 | 1 | 1 | 1 | x | x | x | x | x | x | x | x |
| 0 | 0 | 1 | 1 | 0 | 1 | 0 | 0 | 0 | x | x | 1 | 0 | 0 | 1 | 0 | 1 |
| 0 | 0 | 1 | 1 | 0 | 1 | 0 | 0 | 1 | x | x | 1 | 0 | 0 | 1 | 1 | 0 |
| 0 | 0 | 1 | 1 | 0 | 1 | 0 | 1 | 0 | x | x | 1 | 0 | 0 | 1 | 0 | 0 |
| 0 | 0 | 1 | 1 | 0 | 1 | 0 | 1 | 1 | x | x | x | x | x | x | x | x |
| 0 | 0 | 1 | 1 | 0 | 1 | 1 | 0 | 0 | x | x | 1 | 0 | 0 | 1 | 1 | 1 |
| 0 | 0 | 1 | 1 | 0 | 1 | 1 | 0 | 1 | x | x | 1 | 0 | 0 | 1 | 0 | 1 |
| 0 | 0 | 1 | 1 | 0 | 1 | 1 | 1 | 0 | x | x | 1 | 0 | 0 | 1 | 1 | 0 |
| 0 | 0 | 1 | 1 | 0 | 1 | 1 | 1 | 1 | x | x | x | x | x | x | x | x |
| 0 | 0 | 1 | 1 | 1 | 0 | 0 | 0 | 0 | x | x | 1 | 0 | 1 | 0 | 0 | 1 |
| 0 | 0 | 1 | 1 | 1 | 0 | 0 | 0 | 1 | x | x | 1 | 0 | 1 | 0 | 1 | 0 |
| 0 | 0 | 1 | 1 | 1 | 0 | 0 | 1 | 0 | x | x | 1 | 0 | 1 | 0 | 0 | 0 |
| 0 | 0 | 1 | 1 | 1 | 0 | 0 | 1 | 1 | x | x | x | x | x | x | x | x |
| 0 | 0 | 1 | 1 | 1 | 0 | 1 | 0 | 0 | x | x | 1 | 0 | 1 | 0 | 1 | 1 |
| 0 | 0 | 1 | 1 | 1 | 0 | 1 | 0 | 1 | x | x | 1 | 0 | 1 | 0 | 0 | 1 |
| 0 | 0 | 1 | 1 | 1 | 0 | 1 | 1 | 0 | x | x | 1 | 0 | 1 | 0 | 1 | 0 |
| 0 | 0 | 1 | 1 | 1 | 0 | 1 | 1 | 1 | x | x | x | x | x | x | x | x |
| 0 | 0 | 1 | 1 | 1 | 1 | 0 | 0 | 0 | x | x | x | x | x | x | x | x |
| 0 | 0 | 1 | 1 | 1 | 1 | 0 | 0 | 1 | x | x | x | x | x | x | x | x |
| 0 | 0 | 1 | 1 | 1 | 1 | 0 | 1 | 0 | x | x | x | x | x | x | x | x |
| 0 | 0 | 1 | 1 | 1 | 1 | 0 | 1 | 1 | x | x | x | x | x | x | x | x |
| 0 | 0 | 1 | 1 | 1 | 1 | 1 | 0 | 0 | x | x | x | x | x | x | x | x |
| 0 | 0 | 1 | 1 | 1 | 1 | 1 | 0 | 1 | x | x | x | x | x | x | x | x |
| 0 | 0 | 1 | 1 | 1 | 1 | 1 | 1 | 0 | x | x | x | x | x | x | x | x |
| 0 | 0 | 1 | 1 | 1 | 1 | 1 | 1 | 1 | x | x | x | x | x | x | x | x |

FIG. 9

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 1 | 0 | 0 | 0 | 0 | 0 | 0 | 0 | x | x | 0 | 0 | 0 | 1 | 0 | 1 |
| 0 | 1 | 0 | 0 | 0 | 0 | 0 | 0 | 1 | x | x | 0 | 0 | 0 | 1 | 1 | 0 |
| 0 | 1 | 0 | 0 | 0 | 0 | 0 | 1 | 0 | x | x | 0 | 0 | 0 | 1 | 0 | 0 |
| 0 | 1 | 0 | 0 | 0 | 0 | 0 | 1 | 1 | x | x | x | x | x | x | x | x |
| 0 | 1 | 0 | 0 | 0 | 0 | 1 | 0 | 0 | x | x | 0 | 0 | 0 | 1 | 1 | 1 |
| 0 | 1 | 0 | 0 | 0 | 0 | 1 | 0 | 1 | x | x | 0 | 0 | 0 | 1 | 0 | 1 |
| 0 | 1 | 0 | 0 | 0 | 0 | 1 | 1 | 0 | x | x | 0 | 0 | 0 | 1 | 1 | 0 |
| 0 | 1 | 0 | 0 | 0 | 0 | 1 | 1 | 1 | x | x | x | x | x | x | x | x |
| 0 | 1 | 0 | 0 | 0 | 1 | 0 | 0 | 0 | x | x | 0 | 0 | 1 | 0 | 0 | 1 |
| 0 | 1 | 0 | 0 | 0 | 1 | 0 | 0 | 1 | x | x | 0 | 0 | 1 | 0 | 1 | 0 |
| 0 | 1 | 0 | 0 | 0 | 1 | 0 | 1 | 0 | x | x | 0 | 0 | 1 | 0 | 0 | 0 |
| 0 | 1 | 0 | 0 | 0 | 1 | 0 | 1 | 1 | x | x | x | x | x | x | x | x |
| 0 | 1 | 0 | 0 | 0 | 1 | 1 | 0 | 0 | x | x | 0 | 0 | 1 | 0 | 1 | 1 |
| 0 | 1 | 0 | 0 | 0 | 1 | 1 | 0 | 1 | x | x | 0 | 0 | 1 | 0 | 0 | 1 |
| 0 | 1 | 0 | 0 | 0 | 1 | 1 | 1 | 0 | x | x | 0 | 0 | 1 | 0 | 1 | 0 |
| 0 | 1 | 0 | 0 | 0 | 1 | 1 | 1 | 1 | x | x | x | x | x | x | x | x |
| 0 | 1 | 0 | 0 | 1 | 0 | 0 | 0 | 0 | x | x | 0 | 0 | 0 | 0 | 0 | 1 |
| 0 | 1 | 0 | 0 | 1 | 0 | 0 | 0 | 1 | x | x | 0 | 0 | 0 | 0 | 1 | 0 |
| 0 | 1 | 0 | 0 | 1 | 0 | 0 | 1 | 0 | x | x | 0 | 0 | 0 | 0 | 0 | 0 |
| 0 | 1 | 0 | 0 | 1 | 0 | 0 | 1 | 1 | x | x | x | x | x | x | x | x |
| 0 | 1 | 0 | 0 | 1 | 0 | 1 | 0 | 0 | x | x | 0 | 0 | 0 | 0 | 1 | 1 |
| 0 | 1 | 0 | 0 | 1 | 0 | 1 | 0 | 1 | x | x | 0 | 0 | 0 | 0 | 0 | 1 |
| 0 | 1 | 0 | 0 | 1 | 0 | 1 | 1 | 0 | x | x | 0 | 0 | 0 | 0 | 1 | 0 |
| 0 | 1 | 0 | 0 | 1 | 0 | 1 | 1 | 1 | x | x | x | x | x | x | x | x |
| 0 | 1 | 0 | 0 | 1 | 1 | 0 | 0 | 0 | x | x | x | x | x | x | x | x |
| 0 | 1 | 0 | 0 | 1 | 1 | 0 | 0 | 1 | x | x | x | x | x | x | x | x |
| 0 | 1 | 0 | 0 | 1 | 1 | 0 | 1 | 0 | x | x | x | x | x | x | x | x |
| 0 | 1 | 0 | 0 | 1 | 1 | 0 | 1 | 1 | x | x | x | x | x | x | x | x |
| 0 | 1 | 0 | 0 | 1 | 1 | 1 | 0 | 0 | x | x | x | x | x | x | x | x |
| 0 | 1 | 0 | 0 | 1 | 1 | 1 | 0 | 1 | x | x | x | x | x | x | x | x |
| 0 | 1 | 0 | 0 | 1 | 1 | 1 | 1 | 0 | x | x | x | x | x | x | x | x |
| 0 | 1 | 0 | 0 | 1 | 1 | 1 | 1 | 1 | x | x | x | x | x | x | x | x |

FIG. 10

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 1 | 0 | 1 | 0 | 0 | 0 | 0 | 0 | X | X | 0 | 0 | 1 | 1 | 0 | 1 |
| 0 | 1 | 0 | 1 | 0 | 0 | 0 | 0 | 1 | X | X | 0 | 0 | 1 | 1 | 1 | 0 |
| 0 | 1 | 0 | 1 | 0 | 0 | 0 | 1 | 0 | X | X | 0 | 0 | 1 | 1 | 0 | 0 |
| 0 | 1 | 0 | 1 | 0 | 0 | 0 | 1 | 1 | X | X | X | X | X | X | X | X |
| 0 | 1 | 0 | 1 | 0 | 0 | 1 | 0 | 0 | X | X | 0 | 0 | 1 | 1 | 1 | 1 |
| 0 | 1 | 0 | 1 | 0 | 0 | 1 | 0 | 1 | X | X | 0 | 0 | 1 | 1 | 0 | 1 |
| 0 | 1 | 0 | 1 | 0 | 0 | 1 | 1 | 0 | X | X | 0 | 0 | 1 | 1 | 1 | 0 |
| 0 | 1 | 0 | 1 | 0 | 0 | 1 | 1 | 1 | X | X | X | X | X | X | X | X |
| 0 | 1 | 0 | 1 | 0 | 1 | 0 | 0 | 0 | X | X | 0 | 0 | 0 | 1 | 0 | 1 |
| 0 | 1 | 0 | 1 | 0 | 1 | 0 | 0 | 1 | X | X | 0 | 0 | 0 | 1 | 1 | 0 |
| 0 | 1 | 0 | 1 | 0 | 1 | 0 | 1 | 0 | X | X | 0 | 0 | 0 | 1 | 0 | 0 |
| 0 | 1 | 0 | 1 | 0 | 1 | 0 | 1 | 1 | X | X | X | X | X | X | X | X |
| 0 | 1 | 0 | 1 | 0 | 1 | 1 | 0 | 0 | X | X | 0 | 0 | 0 | 1 | 1 | 1 |
| 0 | 1 | 0 | 1 | 0 | 1 | 1 | 0 | 1 | X | X | 0 | 0 | 0 | 1 | 0 | 1 |
| 0 | 1 | 0 | 1 | 0 | 1 | 1 | 1 | 0 | X | X | 0 | 0 | 0 | 1 | 1 | 0 |
| 0 | 1 | 0 | 1 | 0 | 1 | 1 | 1 | 1 | X | X | X | X | X | X | X | X |
| 0 | 1 | 0 | 1 | 1 | 0 | 0 | 0 | 0 | X | X | 0 | 0 | 1 | 0 | 0 | 1 |
| 0 | 1 | 0 | 1 | 1 | 0 | 0 | 0 | 1 | X | X | 0 | 0 | 1 | 0 | 1 | 0 |
| 0 | 1 | 0 | 1 | 1 | 0 | 0 | 1 | 0 | X | X | 0 | 0 | 1 | 0 | 0 | 0 |
| 0 | 1 | 0 | 1 | 1 | 0 | 0 | 1 | 1 | X | X | X | X | X | X | X | X |
| 0 | 1 | 0 | 1 | 1 | 0 | 1 | 0 | 0 | X | X | 0 | 0 | 1 | 0 | 1 | 1 |
| 0 | 1 | 0 | 1 | 1 | 0 | 1 | 0 | 1 | X | X | 0 | 0 | 1 | 0 | 0 | 1 |
| 0 | 1 | 0 | 1 | 1 | 0 | 1 | 1 | 0 | X | X | 0 | 0 | 1 | 0 | 1 | 0 |
| 0 | 1 | 0 | 1 | 1 | 0 | 1 | 1 | 1 | X | X | X | X | X | X | X | X |
| 0 | 1 | 0 | 1 | 1 | 1 | 0 | 0 | 0 | X | X | X | X | X | X | X | X |
| 0 | 1 | 0 | 1 | 1 | 1 | 0 | 0 | 1 | X | X | X | X | X | X | X | X |
| 0 | 1 | 0 | 1 | 1 | 1 | 0 | 1 | 0 | X | X | X | X | X | X | X | X |
| 0 | 1 | 0 | 1 | 1 | 1 | 0 | 1 | 1 | X | X | X | X | X | X | X | X |
| 0 | 1 | 0 | 1 | 1 | 1 | 1 | 0 | 0 | X | X | X | X | X | X | X | X |
| 0 | 1 | 0 | 1 | 1 | 1 | 1 | 0 | 1 | X | X | X | X | X | X | X | X |
| 0 | 1 | 0 | 1 | 1 | 1 | 1 | 1 | 0 | X | X | X | X | X | X | X | X |
| 0 | 1 | 0 | 1 | 1 | 1 | 1 | 1 | 1 | X | X | X | X | X | X | X | X |

FIG. 11

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 1 | 1 | 0 | 0 | 0 | 0 | 0 | 0 | X | X | X | X | X | X | X | X |
| 0 | 1 | 1 | 0 | 0 | 0 | 0 | 0 | 1 | X | X | X | X | X | X | X | X |
| 0 | 1 | 1 | 0 | 0 | 0 | 0 | 1 | 0 | X | X | X | X | X | X | X | X |
| 0 | 1 | 1 | 0 | 0 | 0 | 0 | 1 | 1 | X | X | X | X | X | X | X | X |
| 0 | 1 | 1 | 0 | 0 | 0 | 1 | 0 | 0 | X | X | X | X | X | X | X | X |
| 0 | 1 | 1 | 0 | 0 | 0 | 1 | 0 | 1 | X | X | X | X | X | X | X | X |
| 0 | 1 | 1 | 0 | 0 | 0 | 1 | 1 | 0 | X | X | X | X | X | X | X | X |
| 0 | 1 | 1 | 0 | 0 | 0 | 1 | 1 | 1 | X | X | X | X | X | X | X | X |
| 0 | 1 | 1 | 0 | 0 | 1 | 0 | 0 | 0 | X | X | X | X | X | X | X | X |
| 0 | 1 | 1 | 0 | 0 | 1 | 0 | 0 | 1 | X | X | X | X | X | X | X | X |
| 0 | 1 | 1 | 0 | 0 | 1 | 0 | 1 | 0 | X | X | X | X | X | X | X | X |
| 0 | 1 | 1 | 0 | 0 | 1 | 0 | 1 | 1 | X | X | X | X | X | X | X | X |
| 0 | 1 | 1 | 0 | 0 | 1 | 1 | 0 | 0 | X | X | X | X | X | X | X | X |
| 0 | 1 | 1 | 0 | 0 | 1 | 1 | 0 | 1 | X | X | X | X | X | X | X | X |
| 0 | 1 | 1 | 0 | 0 | 1 | 1 | 1 | 0 | X | X | X | X | X | X | X | X |
| 0 | 1 | 1 | 0 | 0 | 1 | 1 | 1 | 1 | X | X | X | X | X | X | X | X |
| 0 | 1 | 1 | 0 | 1 | 0 | 0 | 0 | 0 | X | X | X | X | X | X | X | X |
| 0 | 1 | 1 | 0 | 1 | 0 | 0 | 0 | 1 | X | X | X | X | X | X | X | X |
| 0 | 1 | 1 | 0 | 1 | 0 | 0 | 1 | 0 | X | X | X | X | X | X | X | X |
| 0 | 1 | 1 | 0 | 1 | 0 | 0 | 1 | 1 | X | X | X | X | X | X | X | X |
| 0 | 1 | 1 | 0 | 1 | 0 | 1 | 0 | 0 | X | X | X | X | X | X | X | X |
| 0 | 1 | 1 | 0 | 1 | 0 | 1 | 0 | 1 | X | X | X | X | X | X | X | X |
| 0 | 1 | 1 | 0 | 1 | 0 | 1 | 1 | 0 | X | X | X | X | X | X | X | X |
| 0 | 1 | 1 | 0 | 1 | 0 | 1 | 1 | 1 | X | X | X | X | X | X | X | X |
| 0 | 1 | 1 | 0 | 1 | 1 | 0 | 0 | 0 | X | X | X | X | X | X | X | X |
| 0 | 1 | 1 | 0 | 1 | 1 | 0 | 0 | 1 | X | X | X | X | X | X | X | X |
| 0 | 1 | 1 | 0 | 1 | 1 | 0 | 1 | 0 | X | X | X | X | X | X | X | X |
| 0 | 1 | 1 | 0 | 1 | 1 | 0 | 1 | 1 | X | X | X | X | X | X | X | X |
| 0 | 1 | 1 | 0 | 1 | 1 | 1 | 0 | 0 | X | X | X | X | X | X | X | X |
| 0 | 1 | 1 | 0 | 1 | 1 | 1 | 0 | 1 | X | X | X | X | X | X | X | X |
| 0 | 1 | 1 | 0 | 1 | 1 | 1 | 1 | 0 | X | X | X | X | X | X | X | X |
| 0 | 1 | 1 | 0 | 1 | 1 | 1 | 1 | 1 | X | X | X | X | X | X | X | X |

FIG. 12

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 0 | 1 | 1 | 1 | 0 | 0 | 0 | 0 | 0 | X | X | X | X | X | X | X | X |
| 0 | 1 | 1 | 1 | 0 | 0 | 0 | 0 | 1 | X | X | X | X | X | X | X | X |
| 0 | 1 | 1 | 1 | 0 | 0 | 0 | 1 | 0 | X | X | X | X | X | X | X | X |
| 0 | 1 | 1 | 1 | 0 | 0 | 0 | 1 | 1 | X | X | X | X | X | X | X | X |
| 0 | 1 | 1 | 1 | 0 | 0 | 1 | 0 | 0 | X | X | X | X | X | X | X | X |
| 0 | 1 | 1 | 1 | 0 | 0 | 1 | 0 | 1 | X | X | X | X | X | X | X | X |
| 0 | 1 | 1 | 1 | 0 | 0 | 1 | 1 | 0 | X | X | X | X | X | X | X | X |
| 0 | 1 | 1 | 1 | 0 | 0 | 1 | 1 | 1 | X | X | X | X | X | X | X | X |
| 0 | 1 | 1 | 1 | 0 | 1 | 0 | 0 | 0 | X | X | X | X | X | X | X | X |
| 0 | 1 | 1 | 1 | 0 | 1 | 0 | 0 | 1 | X | X | X | X | X | X | X | X |
| 0 | 1 | 1 | 1 | 0 | 1 | 0 | 1 | 0 | X | X | X | X | X | X | X | X |
| 0 | 1 | 1 | 1 | 0 | 1 | 0 | 1 | 1 | X | X | X | X | X | X | X | X |
| 0 | 1 | 1 | 1 | 0 | 1 | 1 | 0 | 0 | X | X | X | X | X | X | X | X |
| 0 | 1 | 1 | 1 | 0 | 1 | 1 | 0 | 1 | X | X | X | X | X | X | X | X |
| 0 | 1 | 1 | 1 | 0 | 1 | 1 | 1 | 0 | X | X | X | X | X | X | X | X |
| 0 | 1 | 1 | 1 | 0 | 1 | 1 | 1 | 1 | X | X | X | X | X | X | X | X |
| 0 | 1 | 1 | 1 | 1 | 0 | 0 | 0 | 0 | X | X | X | X | X | X | X | X |
| 0 | 1 | 1 | 1 | 1 | 0 | 0 | 0 | 1 | X | X | X | X | X | X | X | X |
| 0 | 1 | 1 | 1 | 1 | 0 | 0 | 1 | 0 | X | X | X | X | X | X | X | X |
| 0 | 1 | 1 | 1 | 1 | 0 | 0 | 1 | 1 | X | X | X | X | X | X | X | X |
| 0 | 1 | 1 | 1 | 1 | 0 | 1 | 0 | 0 | X | X | X | X | X | X | X | X |
| 0 | 1 | 1 | 1 | 1 | 0 | 1 | 0 | 1 | X | X | X | X | X | X | X | X |
| 0 | 1 | 1 | 1 | 1 | 0 | 1 | 1 | 0 | X | X | X | X | X | X | X | X |
| 0 | 1 | 1 | 1 | 1 | 0 | 1 | 1 | 1 | X | X | X | X | X | X | X | X |
| 0 | 1 | 1 | 1 | 1 | 1 | 0 | 0 | 0 | X | X | X | X | X | X | X | X |
| 0 | 1 | 1 | 1 | 1 | 1 | 0 | 0 | 1 | X | X | X | X | X | X | X | X |
| 0 | 1 | 1 | 1 | 1 | 1 | 0 | 1 | 0 | X | X | X | X | X | X | X | X |
| 0 | 1 | 1 | 1 | 1 | 1 | 0 | 1 | 1 | X | X | X | X | X | X | X | X |
| 0 | 1 | 1 | 1 | 1 | 1 | 1 | 0 | 0 | X | X | X | X | X | X | X | X |
| 0 | 1 | 1 | 1 | 1 | 1 | 1 | 0 | 1 | X | X | X | X | X | X | X | X |
| 0 | 1 | 1 | 1 | 1 | 1 | 1 | 1 | 0 | X | X | X | X | X | X | X | X |
| 0 | 1 | 1 | 1 | 1 | 1 | 1 | 1 | 1 | X | X | X | X | X | X | X | X |

FIG. 13

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 0 | 0 | 0 | 0 | 0 | 0 | 0 | 0 | x | x | 1 | 1 | 0 | 1 | 0 | 1 |
| 1 | 0 | 0 | 0 | 0 | 0 | 0 | 0 | 1 | x | x | 1 | 1 | 0 | 1 | 1 | 0 |
| 1 | 0 | 0 | 0 | 0 | 0 | 0 | 1 | 0 | x | x | 1 | 1 | 0 | 1 | 0 | 0 |
| 1 | 0 | 0 | 0 | 0 | 0 | 0 | 1 | 1 | x | x | x | x | x | x | x | x |
| 1 | 0 | 0 | 0 | 0 | 0 | 1 | 0 | 0 | x | x | 1 | 1 | 0 | 1 | 1 | 1 |
| 1 | 0 | 0 | 0 | 0 | 0 | 1 | 0 | 1 | x | x | 1 | 1 | 0 | 1 | 0 | 1 |
| 1 | 0 | 0 | 0 | 0 | 0 | 1 | 1 | 0 | x | x | 1 | 1 | 0 | 1 | 1 | 0 |
| 1 | 0 | 0 | 0 | 0 | 0 | 1 | 1 | 1 | x | x | x | x | x | x | x | x |
| 1 | 0 | 0 | 0 | 0 | 1 | 0 | 0 | 0 | x | x | 1 | 1 | 1 | 0 | 0 | 1 |
| 1 | 0 | 0 | 0 | 0 | 1 | 0 | 0 | 1 | x | x | 1 | 1 | 1 | 0 | 1 | 0 |
| 1 | 0 | 0 | 0 | 0 | 1 | 0 | 1 | 0 | x | x | 1 | 1 | 1 | 0 | 0 | 0 |
| 1 | 0 | 0 | 0 | 0 | 1 | 0 | 1 | 1 | x | x | x | x | x | x | x | x |
| 1 | 0 | 0 | 0 | 0 | 1 | 1 | 0 | 0 | x | x | 1 | 1 | 1 | 0 | 1 | 1 |
| 1 | 0 | 0 | 0 | 0 | 1 | 1 | 0 | 1 | x | x | 1 | 1 | 1 | 0 | 0 | 1 |
| 1 | 0 | 0 | 0 | 0 | 1 | 1 | 1 | 0 | x | x | 1 | 1 | 1 | 0 | 1 | 0 |
| 1 | 0 | 0 | 0 | 0 | 1 | 1 | 1 | 1 | x | x | x | x | x | x | x | x |
| 1 | 0 | 0 | 0 | 1 | 0 | 0 | 0 | 0 | x | x | 1 | 1 | 0 | 0 | 0 | 1 |
| 1 | 0 | 0 | 0 | 1 | 0 | 0 | 0 | 1 | x | x | 1 | 1 | 0 | 0 | 1 | 0 |
| 1 | 0 | 0 | 0 | 1 | 0 | 0 | 1 | 0 | x | x | 1 | 1 | 0 | 0 | 0 | 0 |
| 1 | 0 | 0 | 0 | 1 | 0 | 0 | 1 | 1 | x | x | x | x | x | x | x | x |
| 1 | 0 | 0 | 0 | 1 | 0 | 1 | 0 | 0 | x | x | 1 | 1 | 0 | 0 | 1 | 1 |
| 1 | 0 | 0 | 0 | 1 | 0 | 1 | 0 | 1 | x | x | 1 | 1 | 0 | 0 | 0 | 1 |
| 1 | 0 | 0 | 0 | 1 | 0 | 1 | 1 | 0 | x | x | 1 | 1 | 0 | 0 | 1 | 0 |
| 1 | 0 | 0 | 0 | 1 | 0 | 1 | 1 | 1 | x | x | x | x | x | x | x | x |
| 1 | 0 | 0 | 0 | 1 | 1 | 0 | 0 | 0 | x | x | x | x | x | x | x | x |
| 1 | 0 | 0 | 0 | 1 | 1 | 0 | 0 | 1 | x | x | x | x | x | x | x | x |
| 1 | 0 | 0 | 0 | 1 | 1 | 0 | 1 | 0 | x | x | x | x | x | x | x | x |
| 1 | 0 | 0 | 0 | 1 | 1 | 0 | 1 | 1 | x | x | x | x | x | x | x | x |
| 1 | 0 | 0 | 0 | 1 | 1 | 1 | 0 | 0 | x | x | x | x | x | x | x | x |
| 1 | 0 | 0 | 0 | 1 | 1 | 1 | 0 | 1 | x | x | x | x | x | x | x | x |
| 1 | 0 | 0 | 0 | 1 | 1 | 1 | 1 | 0 | x | x | x | x | x | x | x | x |
| 1 | 0 | 0 | 0 | 1 | 1 | 1 | 1 | 1 | x | x | x | x | x | x | x | x |

FIG. 14

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 0 | 0 | 1 | 0 | 0 | 0 | 0 | 0 | x | x | 1 | 1 | 1 | 1 | 0 | 1 |
| 1 | 0 | 0 | 1 | 0 | 0 | 0 | 0 | 1 | x | x | 1 | 1 | 1 | 1 | 1 | 0 |
| 1 | 0 | 0 | 1 | 0 | 0 | 0 | 1 | 0 | x | x | 1 | 1 | 1 | 1 | 0 | 0 |
| 1 | 0 | 0 | 1 | 0 | 0 | 0 | 1 | 1 | x | x | x | x | x | x | x | x |
| 1 | 0 | 0 | 1 | 0 | 0 | 1 | 0 | 0 | x | x | 1 | 1 | 1 | 1 | 1 | 1 |
| 1 | 0 | 0 | 1 | 0 | 0 | 1 | 0 | 1 | x | x | 1 | 1 | 1 | 1 | 0 | 1 |
| 1 | 0 | 0 | 1 | 0 | 0 | 1 | 1 | 0 | x | x | 1 | 1 | 1 | 1 | 1 | 0 |
| 1 | 0 | 0 | 1 | 0 | 0 | 1 | 1 | 1 | x | x | x | x | x | x | x | x |
| 1 | 0 | 0 | 1 | 0 | 1 | 0 | 0 | 0 | x | x | 1 | 1 | 0 | 1 | 0 | 1 |
| 1 | 0 | 0 | 1 | 0 | 1 | 0 | 0 | 1 | x | x | 1 | 1 | 0 | 1 | 1 | 0 |
| 1 | 0 | 0 | 1 | 0 | 1 | 0 | 1 | 0 | x | x | 1 | 1 | 0 | 1 | 0 | 0 |
| 1 | 0 | 0 | 1 | 0 | 1 | 0 | 1 | 1 | x | x | x | x | x | x | x | x |
| 1 | 0 | 0 | 1 | 0 | 1 | 1 | 0 | 0 | x | x | 1 | 1 | 0 | 1 | 1 | 1 |
| 1 | 0 | 0 | 1 | 0 | 1 | 1 | 0 | 1 | x | x | 1 | 1 | 0 | 1 | 0 | 1 |
| 1 | 0 | 0 | 1 | 0 | 1 | 1 | 1 | 0 | x | x | 1 | 1 | 0 | 1 | 1 | 0 |
| 1 | 0 | 0 | 1 | 0 | 1 | 1 | 1 | 1 | x | x | x | x | x | x | x | x |
| 1 | 0 | 0 | 1 | 1 | 0 | 0 | 0 | 0 | x | x | 1 | 1 | 1 | 0 | 0 | 1 |
| 1 | 0 | 0 | 1 | 1 | 0 | 0 | 0 | 1 | x | x | 1 | 1 | 1 | 0 | 1 | 0 |
| 1 | 0 | 0 | 1 | 1 | 0 | 0 | 1 | 0 | x | x | 1 | 1 | 1 | 0 | 0 | 0 |
| 1 | 0 | 0 | 1 | 1 | 0 | 0 | 1 | 1 | x | x | x | x | x | x | x | x |
| 1 | 0 | 0 | 1 | 1 | 0 | 1 | 0 | 0 | x | x | 1 | 1 | 1 | 0 | 1 | 1 |
| 1 | 0 | 0 | 1 | 1 | 0 | 1 | 0 | 1 | x | x | 1 | 1 | 1 | 0 | 0 | 1 |
| 1 | 0 | 0 | 1 | 1 | 0 | 1 | 1 | 0 | x | x | 1 | 1 | 1 | 0 | 1 | 0 |
| 1 | 0 | 0 | 1 | 1 | 0 | 1 | 1 | 1 | x | x | x | x | x | x | x | x |
| 1 | 0 | 0 | 1 | 1 | 1 | 0 | 0 | 0 | x | x | x | x | x | x | x | x |
| 1 | 0 | 0 | 1 | 1 | 1 | 0 | 0 | 1 | x | x | x | x | x | x | x | x |
| 1 | 0 | 0 | 1 | 1 | 1 | 0 | 1 | 0 | x | x | x | x | x | x | x | x |
| 1 | 0 | 0 | 1 | 1 | 1 | 0 | 1 | 1 | x | x | x | x | x | x | x | x |
| 1 | 0 | 0 | 1 | 1 | 1 | 1 | 0 | 0 | x | x | x | x | x | x | x | x |
| 1 | 0 | 0 | 1 | 1 | 1 | 1 | 0 | 1 | x | x | x | x | x | x | x | x |
| 1 | 0 | 0 | 1 | 1 | 1 | 1 | 1 | 0 | x | x | x | x | x | x | x | x |
| 1 | 0 | 0 | 1 | 1 | 1 | 1 | 1 | 1 | x | x | x | x | x | x | x | x |

FIG. 15

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 0 | 1 | 0 | 0 | 0 | 0 | 0 | 0 | X | X | 0 | 0 | 0 | 1 | 0 | 1 |
| 1 | 0 | 1 | 0 | 0 | 0 | 0 | 0 | 1 | X | X | 0 | 0 | 0 | 1 | 1 | 0 |
| 1 | 0 | 1 | 0 | 0 | 0 | 0 | 1 | 0 | X | X | 0 | 0 | 0 | 1 | 0 | 0 |
| 1 | 0 | 1 | 0 | 0 | 0 | 0 | 1 | 1 | X | X | X | X | X | X | X | X |
| 1 | 0 | 1 | 0 | 0 | 0 | 1 | 0 | 0 | X | X | 0 | 0 | 0 | 1 | 1 | 1 |
| 1 | 0 | 1 | 0 | 0 | 0 | 1 | 0 | 1 | X | X | 0 | 0 | 0 | 1 | 0 | 1 |
| 1 | 0 | 1 | 0 | 0 | 0 | 1 | 1 | 0 | X | X | 0 | 0 | 0 | 1 | 1 | 0 |
| 1 | 0 | 1 | 0 | 0 | 0 | 1 | 1 | 1 | X | X | X | X | X | X | X | X |
| 1 | 0 | 1 | 0 | 0 | 1 | 0 | 0 | 0 | X | X | 0 | 0 | 1 | 0 | 0 | 1 |
| 1 | 0 | 1 | 0 | 0 | 1 | 0 | 0 | 1 | X | X | 0 | 0 | 1 | 0 | 1 | 0 |
| 1 | 0 | 1 | 0 | 0 | 1 | 0 | 1 | 0 | X | X | 0 | 0 | 1 | 0 | 0 | 0 |
| 1 | 0 | 1 | 0 | 0 | 1 | 0 | 1 | 1 | X | X | X | X | X | X | X | X |
| 1 | 0 | 1 | 0 | 0 | 1 | 1 | 0 | 0 | X | X | 0 | 0 | 1 | 0 | 1 | 1 |
| 1 | 0 | 1 | 0 | 0 | 1 | 1 | 0 | 1 | X | X | 0 | 0 | 1 | 0 | 0 | 1 |
| 1 | 0 | 1 | 0 | 0 | 1 | 1 | 1 | 0 | X | X | 0 | 0 | 1 | 0 | 0 | 1 |
| 1 | 0 | 1 | 0 | 0 | 1 | 1 | 1 | 1 | X | X | X | X | X | X | X | X |
| 1 | 0 | 1 | 0 | 1 | 0 | 0 | 0 | 0 | X | X | 0 | 0 | 0 | 0 | 0 | 1 |
| 1 | 0 | 1 | 0 | 1 | 0 | 0 | 0 | 1 | X | X | 0 | 0 | 0 | 0 | 1 | 0 |
| 1 | 0 | 1 | 0 | 1 | 0 | 0 | 1 | 0 | X | X | 0 | 0 | 0 | 0 | 0 | 0 |
| 1 | 0 | 1 | 0 | 1 | 0 | 0 | 1 | 1 | X | X | X | X | X | X | X | X |
| 1 | 0 | 1 | 0 | 1 | 0 | 1 | 0 | 0 | X | X | 0 | 0 | 0 | 0 | 1 | 1 |
| 1 | 0 | 1 | 0 | 1 | 0 | 1 | 0 | 1 | X | X | 0 | 0 | 0 | 0 | 0 | 1 |
| 1 | 0 | 1 | 0 | 1 | 0 | 1 | 1 | 0 | X | X | 0 | 0 | 0 | 0 | 1 | 0 |
| 1 | 0 | 1 | 0 | 1 | 0 | 1 | 1 | 1 | X | X | X | X | X | X | X | X |
| 1 | 0 | 1 | 0 | 1 | 1 | 0 | 0 | 0 | X | X | X | X | X | X | X | X |
| 1 | 0 | 1 | 0 | 1 | 1 | 0 | 0 | 1 | X | X | X | X | X | X | X | X |
| 1 | 0 | 1 | 0 | 1 | 1 | 0 | 1 | 0 | X | X | X | X | X | X | X | X |
| 1 | 0 | 1 | 0 | 1 | 1 | 0 | 1 | 1 | X | X | X | X | X | X | X | X |
| 1 | 0 | 1 | 0 | 1 | 1 | 1 | 0 | 0 | X | X | X | X | X | X | X | X |
| 1 | 0 | 1 | 0 | 1 | 1 | 1 | 0 | 1 | X | X | X | X | X | X | X | X |
| 1 | 0 | 1 | 0 | 1 | 1 | 1 | 1 | 0 | X | X | X | X | X | X | X | X |
| 1 | 0 | 1 | 0 | 1 | 1 | 1 | 1 | 1 | X | X | X | X | X | X | X | X |

FIG. 16

| A8 | A7 | A6 | A5 | A4 | A3 | A2 | A1 | A0 | Q8 | Q7 | Q6 | Q5 | Q4 | Q3 | Q2 | Q1 |
|---|---|---|---|---|---|---|---|---|---|---|---|---|---|---|---|---|
| 1 | 0 | 1 | 1 | 0 | 0 | 0 | 0 | 0 | x | x | 0 | 1 | 1 | 1 | 0 | 1 |
| 1 | 0 | 1 | 1 | 0 | 0 | 0 | 0 | 1 | x | x | 0 | 1 | 1 | 1 | 1 | 0 |
| 1 | 0 | 1 | 1 | 0 | 0 | 0 | 1 | 0 | x | x | 0 | 1 | 1 | 1 | 0 | 0 |
| 1 | 0 | 1 | 1 | 0 | 0 | 0 | 1 | 1 | x | x | x | x | x | x | x | x |
| 1 | 0 | 1 | 1 | 0 | 0 | 1 | 0 | 0 | x | x | 0 | 1 | 1 | 1 | 1 | 1 |
| 1 | 0 | 1 | 1 | 0 | 0 | 1 | 0 | 1 | x | x | 0 | 1 | 1 | 1 | 0 | 1 |
| 1 | 0 | 1 | 1 | 0 | 0 | 1 | 1 | 0 | x | x | 0 | 1 | 1 | 1 | 1 | 0 |
| 1 | 0 | 1 | 1 | 0 | 0 | 1 | 1 | 1 | x | x | x | x | x | x | x | x |
| 1 | 0 | 1 | 1 | 0 | 1 | 0 | 0 | 0 | x | x | 0 | 1 | 0 | 1 | 0 | 1 |
| 1 | 0 | 1 | 1 | 0 | 1 | 0 | 0 | 1 | x | x | 0 | 1 | 0 | 1 | 1 | 0 |
| 1 | 0 | 1 | 1 | 0 | 1 | 0 | 1 | 0 | x | x | 0 | 1 | 0 | 1 | 0 | 0 |
| 1 | 0 | 1 | 1 | 0 | 1 | 0 | 1 | 1 | x | x | x | x | x | x | x | x |
| 1 | 0 | 1 | 1 | 0 | 1 | 1 | 0 | 0 | x | x | 0 | 1 | 0 | 1 | 1 | 1 |
| 1 | 0 | 1 | 1 | 0 | 1 | 1 | 0 | 1 | x | x | 0 | 1 | 0 | 1 | 0 | 1 |
| 1 | 0 | 1 | 1 | 0 | 1 | 1 | 1 | 0 | x | x | 0 | 1 | 0 | 1 | 1 | 0 |
| 1 | 0 | 1 | 1 | 0 | 1 | 1 | 1 | 1 | x | x | x | x | x | x | x | x |
| 1 | 0 | 1 | 1 | 1 | 0 | 0 | 0 | 0 | x | x | 0 | 1 | 1 | 0 | 0 | 1 |
| 1 | 0 | 1 | 1 | 1 | 0 | 0 | 0 | 1 | x | x | 0 | 1 | 1 | 0 | 1 | 0 |
| 1 | 0 | 1 | 1 | 1 | 0 | 0 | 1 | 0 | x | x | 0 | 1 | 1 | 0 | 0 | 0 |
| 1 | 0 | 1 | 1 | 1 | 0 | 0 | 1 | 1 | x | x | x | x | x | x | x | x |
| 1 | 0 | 1 | 1 | 1 | 0 | 1 | 0 | 0 | x | x | 0 | 1 | 1 | 0 | 1 | 1 |
| 1 | 0 | 1 | 1 | 1 | 0 | 1 | 0 | 1 | x | x | 0 | 1 | 1 | 0 | 0 | 1 |
| 1 | 0 | 1 | 1 | 1 | 0 | 1 | 1 | 0 | x | x | 0 | 1 | 1 | 0 | 1 | 0 |
| 1 | 0 | 1 | 1 | 1 | 0 | 1 | 1 | 1 | x | x | x | x | x | x | x | x |
| 1 | 0 | 1 | 1 | 1 | 1 | 0 | 0 | 0 | x | x | x | x | x | x | x | x |
| 1 | 0 | 1 | 1 | 1 | 1 | 0 | 0 | 1 | x | x | x | x | x | x | x | x |
| 1 | 0 | 1 | 1 | 1 | 1 | 0 | 1 | 0 | x | x | x | x | x | x | x | x |
| 1 | 0 | 1 | 1 | 1 | 1 | 0 | 1 | 1 | x | x | x | x | x | x | x | x |
| 1 | 0 | 1 | 1 | 1 | 1 | 1 | 0 | 0 | x | x | x | x | x | x | x | x |
| 1 | 0 | 1 | 1 | 1 | 1 | 1 | 0 | 1 | x | x | x | x | x | x | x | x |
| 1 | 0 | 1 | 1 | 1 | 1 | 1 | 1 | 0 | x | x | x | x | x | x | x | x |
| 1 | 0 | 1 | 1 | 1 | 1 | 1 | 1 | 1 | x | x | x | x | x | x | x | x |

FIG. 17

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 1 | 0 | 0 | 0 | 0 | 0 | 0 | 0 | x | x | 1 | 0 | 0 | 1 | 0 | 1 |
| 1 | 1 | 0 | 0 | 0 | 0 | 0 | 0 | 1 | x | x | 1 | 0 | 0 | 1 | 1 | 0 |
| 1 | 1 | 0 | 0 | 0 | 0 | 0 | 1 | 0 | x | x | 1 | 0 | 0 | 1 | 0 | 0 |
| 1 | 1 | 0 | 0 | 0 | 0 | 0 | 1 | 1 | x | x | x | x | x | x | x | x |
| 1 | 1 | 0 | 0 | 0 | 0 | 1 | 0 | 0 | x | x | 1 | 0 | 0 | 1 | 1 | 1 |
| 1 | 1 | 0 | 0 | 0 | 0 | 1 | 0 | 1 | x | x | 1 | 0 | 0 | 1 | 0 | 1 |
| 1 | 1 | 0 | 0 | 0 | 0 | 1 | 1 | 0 | x | x | 1 | 0 | 0 | 1 | 1 | 0 |
| 1 | 1 | 0 | 0 | 0 | 0 | 1 | 1 | 1 | x | x | x | x | x | x | x | x |
| 1 | 1 | 0 | 0 | 0 | 1 | 0 | 0 | 0 | x | x | 1 | 0 | 1 | 0 | 0 | 1 |
| 1 | 1 | 0 | 0 | 0 | 1 | 0 | 0 | 1 | x | x | 1 | 0 | 1 | 0 | 1 | 0 |
| 1 | 1 | 0 | 0 | 0 | 1 | 0 | 1 | 0 | x | x | 1 | 0 | 1 | 0 | 0 | 0 |
| 1 | 1 | 0 | 0 | 0 | 1 | 0 | 1 | 1 | x | x | x | x | x | x | x | x |
| 1 | 1 | 0 | 0 | 0 | 1 | 1 | 0 | 0 | x | x | 1 | 0 | 1 | 0 | 1 | 1 |
| 1 | 1 | 0 | 0 | 0 | 1 | 1 | 0 | 1 | x | x | 1 | 0 | 1 | 0 | 0 | 1 |
| 1 | 1 | 0 | 0 | 0 | 1 | 1 | 1 | 0 | x | x | 1 | 0 | 1 | 0 | 1 | 0 |
| 1 | 1 | 0 | 0 | 0 | 1 | 1 | 1 | 1 | x | x | x | x | x | x | x | x |
| 1 | 1 | 0 | 0 | 1 | 0 | 0 | 0 | 0 | x | x | 1 | 0 | 0 | 0 | 0 | 1 |
| 1 | 1 | 0 | 0 | 1 | 0 | 0 | 0 | 1 | x | x | 1 | 0 | 0 | 0 | 1 | 0 |
| 1 | 1 | 0 | 0 | 1 | 0 | 0 | 1 | 0 | x | x | 1 | 0 | 0 | 0 | 0 | 0 |
| 1 | 1 | 0 | 0 | 1 | 0 | 0 | 1 | 1 | x | x | x | x | x | x | x | x |
| 1 | 1 | 0 | 0 | 1 | 0 | 1 | 0 | 0 | x | x | 1 | 0 | 0 | 0 | 1 | 1 |
| 1 | 1 | 0 | 0 | 1 | 0 | 1 | 0 | 1 | x | x | 1 | 0 | 0 | 0 | 0 | 1 |
| 1 | 1 | 0 | 0 | 1 | 0 | 1 | 1 | 0 | x | x | 1 | 0 | 0 | 0 | 1 | 0 |
| 1 | 1 | 0 | 0 | 1 | 0 | 1 | 1 | 1 | x | x | x | x | x | x | x | x |
| 1 | 1 | 0 | 0 | 1 | 1 | 0 | 0 | 0 | x | x | x | x | x | x | x | x |
| 1 | 1 | 0 | 0 | 1 | 1 | 0 | 0 | 1 | x | x | x | x | x | x | x | x |
| 1 | 1 | 0 | 0 | 1 | 1 | 0 | 1 | 0 | x | x | x | x | x | x | x | x |
| 1 | 1 | 0 | 0 | 1 | 1 | 0 | 1 | 1 | x | x | x | x | x | x | x | x |
| 1 | 1 | 0 | 0 | 1 | 1 | 1 | 0 | 0 | x | x | x | x | x | x | x | x |
| 1 | 1 | 0 | 0 | 1 | 1 | 1 | 0 | 1 | x | x | x | x | x | x | x | x |
| 1 | 1 | 0 | 0 | 1 | 1 | 1 | 1 | 0 | x | x | x | x | x | x | x | x |
| 1 | 1 | 0 | 0 | 1 | 1 | 1 | 1 | 1 | x | x | x | x | x | x | x | x |

FIG.18

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 1 | 0 | 1 | 0 | 0 | 0 | 0 | 0 | x | x | 1 | 0 | 1 | 1 | 0 | 1 |
| 1 | 1 | 0 | 1 | 0 | 0 | 0 | 0 | 1 | x | x | 1 | 0 | 1 | 1 | 1 | 0 |
| 1 | 1 | 0 | 1 | 0 | 0 | 0 | 1 | 0 | x | x | 1 | 0 | 1 | 1 | 0 | 0 |
| 1 | 1 | 0 | 1 | 0 | 0 | 0 | 1 | 1 | x | x | x | x | x | x | x | x |
| 1 | 1 | 0 | 1 | 0 | 0 | 1 | 0 | 0 | x | x | 1 | 0 | 1 | 1 | 1 | 1 |
| 1 | 1 | 0 | 1 | 0 | 0 | 1 | 0 | 1 | x | x | 1 | 0 | 1 | 1 | 0 | 1 |
| 1 | 1 | 0 | 1 | 0 | 0 | 1 | 1 | 0 | x | x | 1 | 0 | 1 | 1 | 1 | 0 |
| 1 | 1 | 0 | 1 | 0 | 0 | 1 | 1 | 1 | x | x | x | x | x | x | x | x |
| 1 | 1 | 0 | 1 | 0 | 1 | 0 | 0 | 0 | x | x | 1 | 0 | 0 | 1 | 0 | 1 |
| 1 | 1 | 0 | 1 | 0 | 1 | 0 | 0 | 1 | x | x | 1 | 0 | 0 | 1 | 1 | 0 |
| 1 | 1 | 0 | 1 | 0 | 1 | 0 | 1 | 0 | x | x | 1 | 0 | 0 | 1 | 0 | 0 |
| 1 | 1 | 0 | 1 | 0 | 1 | 0 | 1 | 1 | x | x | x | x | x | x | x | x |
| 1 | 1 | 0 | 1 | 0 | 1 | 1 | 0 | 0 | x | x | 1 | 0 | 0 | 1 | 1 | 1 |
| 1 | 1 | 0 | 1 | 0 | 1 | 1 | 0 | 1 | x | x | 1 | 0 | 0 | 1 | 0 | 1 |
| 1 | 1 | 0 | 1 | 0 | 1 | 1 | 1 | 0 | x | x | 1 | 0 | 0 | 1 | 1 | 0 |
| 1 | 1 | 0 | 1 | 0 | 1 | 1 | 1 | 1 | x | x | x | x | x | x | x | x |
| 1 | 1 | 0 | 1 | 1 | 0 | 0 | 0 | 0 | x | x | 1 | 0 | 1 | 0 | 0 | 1 |
| 1 | 1 | 0 | 1 | 1 | 0 | 0 | 0 | 1 | x | x | 1 | 0 | 1 | 0 | 1 | 0 |
| 1 | 1 | 0 | 1 | 1 | 0 | 0 | 1 | 0 | x | x | 1 | 0 | 1 | 0 | 0 | 0 |
| 1 | 1 | 0 | 1 | 1 | 0 | 0 | 1 | 1 | x | x | x | x | x | x | x | x |
| 1 | 1 | 0 | 1 | 1 | 0 | 1 | 0 | 0 | x | x | 1 | 0 | 1 | 0 | 1 | 1 |
| 1 | 1 | 0 | 1 | 1 | 0 | 1 | 0 | 1 | x | x | 1 | 0 | 1 | 0 | 0 | 1 |
| 1 | 1 | 0 | 1 | 1 | 0 | 1 | 1 | 0 | x | x | 1 | 0 | 1 | 0 | 1 | 0 |
| 1 | 1 | 0 | 1 | 1 | 0 | 1 | 1 | 1 | x | x | x | x | x | x | x | x |
| 1 | 1 | 0 | 1 | 1 | 1 | 0 | 0 | 0 | x | x | x | x | x | x | x | x |
| 1 | 1 | 0 | 1 | 1 | 1 | 0 | 0 | 1 | x | x | x | x | x | x | x | x |
| 1 | 1 | 0 | 1 | 1 | 1 | 0 | 1 | 0 | x | x | x | x | x | x | x | x |
| 1 | 1 | 0 | 1 | 1 | 1 | 0 | 1 | 1 | x | x | x | x | x | x | x | x |
| 1 | 1 | 0 | 1 | 1 | 1 | 1 | 0 | 0 | x | x | x | x | x | x | x | x |
| 1 | 1 | 0 | 1 | 1 | 1 | 1 | 0 | 1 | x | x | x | x | x | x | x | x |
| 1 | 1 | 0 | 1 | 1 | 1 | 1 | 1 | 0 | x | x | x | x | x | x | x | x |
| 1 | 1 | 0 | 1 | 1 | 1 | 1 | 1 | 1 | x | x | x | x | x | x | x | x |

FIG. 19

| A8 | A7 | A6 | A5 | A4 | A3 | A2 | A1 | A0 | Q8 | Q7 | Q6 | Q5 | Q4 | Q3 | Q2 | Q1 |
|---|---|---|---|---|---|---|---|---|---|---|---|---|---|---|---|---|
| 1 | 1 | 1 | 0 | 0 | 0 | 0 | 0 | 0 | X | X | X | X | X | X | X | X |
| 1 | 1 | 1 | 0 | 0 | 0 | 0 | 0 | 1 | X | X | X | X | X | X | X | X |
| 1 | 1 | 1 | 0 | 0 | 0 | 0 | 1 | 0 | X | X | X | X | X | X | X | X |
| 1 | 1 | 1 | 0 | 0 | 0 | 0 | 1 | 1 | X | X | X | X | X | X | X | X |
| 1 | 1 | 1 | 0 | 0 | 0 | 1 | 0 | 0 | X | X | X | X | X | X | X | X |
| 1 | 1 | 1 | 0 | 0 | 0 | 1 | 0 | 1 | X | X | X | X | X | X | X | X |
| 1 | 1 | 1 | 0 | 0 | 0 | 1 | 1 | 0 | X | X | X | X | X | X | X | X |
| 1 | 1 | 1 | 0 | 0 | 0 | 1 | 1 | 1 | X | X | X | X | X | X | X | X |
| 1 | 1 | 1 | 0 | 0 | 1 | 0 | 0 | 0 | X | X | X | X | X | X | X | X |
| 1 | 1 | 1 | 0 | 0 | 1 | 0 | 0 | 1 | X | X | X | X | X | X | X | X |
| 1 | 1 | 1 | 0 | 0 | 1 | 0 | 1 | 0 | X | X | X | X | X | X | X | X |
| 1 | 1 | 1 | 0 | 0 | 1 | 0 | 1 | 1 | X | X | X | X | X | X | X | X |
| 1 | 1 | 1 | 0 | 0 | 1 | 1 | 0 | 0 | X | X | X | X | X | X | X | X |
| 1 | 1 | 1 | 0 | 0 | 1 | 1 | 0 | 1 | X | X | X | X | X | X | X | X |
| 1 | 1 | 1 | 0 | 0 | 1 | 1 | 1 | 0 | X | X | X | X | X | X | X | X |
| 1 | 1 | 1 | 0 | 0 | 1 | 1 | 1 | 1 | X | X | X | X | X | X | X | X |
| 1 | 1 | 1 | 0 | 1 | 0 | 0 | 0 | 0 | X | X | X | X | X | X | X | X |
| 1 | 1 | 1 | 0 | 1 | 0 | 0 | 0 | 1 | X | X | X | X | X | X | X | X |
| 1 | 1 | 1 | 0 | 1 | 0 | 0 | 1 | 0 | X | X | X | X | X | X | X | X |
| 1 | 1 | 1 | 0 | 1 | 0 | 0 | 1 | 1 | X | X | X | X | X | X | X | X |
| 1 | 1 | 1 | 0 | 1 | 0 | 1 | 0 | 0 | X | X | X | X | X | X | X | X |
| 1 | 1 | 1 | 0 | 1 | 0 | 1 | 0 | 1 | X | X | X | X | X | X | X | X |
| 1 | 1 | 1 | 0 | 1 | 0 | 1 | 1 | 0 | X | X | X | X | X | X | X | X |
| 1 | 1 | 1 | 0 | 1 | 0 | 1 | 1 | 1 | X | X | X | X | X | X | X | X |
| 1 | 1 | 1 | 0 | 1 | 1 | 0 | 0 | 0 | X | X | X | X | X | X | X | X |
| 1 | 1 | 1 | 0 | 1 | 1 | 0 | 0 | 1 | X | X | X | X | X | X | X | X |
| 1 | 1 | 1 | 0 | 1 | 1 | 0 | 1 | 0 | X | X | X | X | X | X | X | X |
| 1 | 1 | 1 | 0 | 1 | 1 | 0 | 1 | 1 | X | X | X | X | X | X | X | X |
| 1 | 1 | 1 | 0 | 1 | 1 | 1 | 0 | 0 | X | X | X | X | X | X | X | X |
| 1 | 1 | 1 | 0 | 1 | 1 | 1 | 0 | 1 | X | X | X | X | X | X | X | X |
| 1 | 1 | 1 | 0 | 1 | 1 | 1 | 1 | 0 | X | X | X | X | X | X | X | X |
| 1 | 1 | 1 | 0 | 1 | 1 | 1 | 1 | 1 | X | X | X | X | X | X | X | X |

FIG. 20

| $A_8$ | $A_7$ | $A_6$ | $A_5$ | $A_4$ | $A_3$ | $A_2$ | $A_1$ | $A_0$ | $Q_8$ | $Q_7$ | $Q_6$ | $Q_5$ | $Q_4$ | $Q_3$ | $Q_2$ | $Q_1$ |
|---|---|---|---|---|---|---|---|---|---|---|---|---|---|---|---|---|
| 1 | 1 | 1 | 1 | 0 | 0 | 0 | 0 | 0 | X | X | X | X | X | X | X | X |
| 1 | 1 | 1 | 1 | 0 | 0 | 0 | 0 | 1 | X | X | X | X | X | X | X | X |
| 1 | 1 | 1 | 1 | 0 | 0 | 0 | 1 | 0 | X | X | X | X | X | X | X | X |
| 1 | 1 | 1 | 1 | 0 | 0 | 0 | 1 | 1 | X | X | X | X | X | X | X | X |
| 1 | 1 | 1 | 1 | 0 | 0 | 1 | 0 | 0 | X | X | X | X | X | X | X | X |
| 1 | 1 | 1 | 1 | 0 | 0 | 1 | 0 | 1 | X | X | X | X | X | X | X | X |
| 1 | 1 | 1 | 1 | 0 | 0 | 1 | 1 | 0 | X | X | X | X | X | X | X | X |
| 1 | 1 | 1 | 1 | 0 | 0 | 1 | 1 | 1 | X | X | X | X | X | X | X | X |
| 1 | 1 | 1 | 1 | 0 | 1 | 0 | 0 | 0 | X | X | X | X | X | X | X | X |
| 1 | 1 | 1 | 1 | 0 | 1 | 0 | 0 | 1 | X | X | X | X | X | X | X | X |
| 1 | 1 | 1 | 1 | 0 | 1 | 0 | 1 | 0 | X | X | X | X | X | X | X | X |
| 1 | 1 | 1 | 1 | 0 | 1 | 0 | 1 | 1 | X | X | X | X | X | X | X | X |
| 1 | 1 | 1 | 1 | 0 | 1 | 1 | 0 | 0 | X | X | X | X | X | X | X | X |
| 1 | 1 | 1 | 1 | 0 | 1 | 1 | 0 | 1 | X | X | X | X | X | X | X | X |
| 1 | 1 | 1 | 1 | 0 | 1 | 1 | 1 | 0 | X | X | X | X | X | X | X | X |
| 1 | 1 | 1 | 1 | 0 | 1 | 1 | 1 | 1 | X | X | X | X | X | X | X | X |
| 1 | 1 | 1 | 1 | 1 | 0 | 0 | 0 | 0 | X | X | X | X | X | X | X | X |
| 1 | 1 | 1 | 1 | 1 | 0 | 0 | 0 | 1 | X | X | X | X | X | X | X | X |
| 1 | 1 | 1 | 1 | 1 | 0 | 0 | 1 | 0 | X | X | X | X | X | X | X | X |
| 1 | 1 | 1 | 1 | 1 | 0 | 0 | 1 | 1 | X | X | X | X | X | X | X | X |
| 1 | 1 | 1 | 1 | 1 | 0 | 1 | 0 | 0 | X | X | X | X | X | X | X | X |
| 1 | 1 | 1 | 1 | 1 | 0 | 1 | 0 | 1 | X | X | X | X | X | X | X | X |
| 1 | 1 | 1 | 1 | 1 | 0 | 1 | 1 | 0 | X | X | X | X | X | X | X | X |
| 1 | 1 | 1 | 1 | 1 | 0 | 1 | 1 | 1 | X | X | X | X | X | X | X | X |
| 1 | 1 | 1 | 1 | 1 | 1 | 0 | 0 | 0 | X | X | X | X | X | X | X | X |
| 1 | 1 | 1 | 1 | 1 | 1 | 0 | 0 | 1 | X | X | X | X | X | X | X | X |
| 1 | 1 | 1 | 1 | 1 | 1 | 0 | 1 | 0 | X | X | X | X | X | X | X | X |
| 1 | 1 | 1 | 1 | 1 | 1 | 0 | 1 | 1 | X | X | X | X | X | X | X | X |
| 1 | 1 | 1 | 1 | 1 | 1 | 1 | 0 | 0 | X | X | X | X | X | X | X | X |
| 1 | 1 | 1 | 1 | 1 | 1 | 1 | 0 | 1 | X | X | X | X | X | X | X | X |
| 1 | 1 | 1 | 1 | 1 | 1 | 1 | 1 | 0 | X | X | X | X | X | X | X | X |
| 1 | 1 | 1 | 1 | 1 | 1 | 1 | 1 | 1 | X | X | X | X | X | X | X | X |

FIG. 21

TERNARY TO BINARY CONVERTER

BACKGROUND OF THE INVENTION

This invention relates in general to electric signal processing circuits and, more particularly, to new and improved means for converting ternary data carried on two transmission lines into binary data for transmission on one line.

Technological advance in the field of signal processing, as exemplified by the development of pulse code modulation, has evolved along several lines. In general, most systems utilize a binary modulation.

There are instances, however, where a ternary signal is convenient. In such a system three conditions may be signalled by means of on and off pulses carried on three wires, with pulse signals carried on one pair of wires, a line, indicating one condition, pulse signals on another pair or line indicating another condition, and the absence of signals, the third condition, for example. Such systems are used in control systems where three levels are used to signal a particular operation or condition: forward, reverse, or neutral; or up, down, or center. Some inertial guidance systems use ternary signals for communicating error signals between the stable platform and computer. In other systems, binary signals are used. It is becoming more and more desirable to arrange for communications between system components which were originally built to use differing systems. In addition there are recognized economies in system cost and improvements in system reliability to be gained by communicating on two wires as compared to three.

SUMMARY OF THE INVENTION

The present invention realizes these objects and others which will be apparent to those skilled in the art as follows. Serial ternary coded information is converted into serial binary coded information by interrupting a binary, zero-rate, data stream, representing a first ternary condition, with a positive signal, representing a second ternary condition, or by transmitting no signal, to represent the third ternary condition. This is accomplished through the use of Boolean logic, using a minimal number of standard electronic components.

These requirements are satisfied by the present invention in a method wherein first a determination is made of which of three ternary states is being received at a given time, and then one of three possible signals coded in arbitrary correspondence to the incoming ternary signal, is chosen and transmitted on the binary transmission line. The selected signal may be, for example, either an alternating voltage, a DC voltage, or zero voltage. Note is made of the signal being transmitted and the information taken into account at the time the next signal is chosen. In a preferred embodiment of the invention, the process is repeated at intervals synchronous with the input signals.

In one embodiment of the invention, a flip-flop is used for storing the "present" state of the binary signal being generated, a second flip-flop is used for storing the "next" state of the system, and means are provided which respond to the binary coded inputs and the "present" state of the binary output for determining what the next output of the system will be. The input signals are synchronous with a clock pulse which initiates each action of the circuit. A multiplexer responds to the binary coded inputs and the "present" state of the binary output and selects the next output of the system.

In another embodiment of the invention, a read only memory responds to the binary coded inputs and to a "present" state signal forming part of the memory's binary output and retained for use in addressing the memory at the time the next output signal is to be generated.

BRIEF DESCRIPTION OF THE DRAWINGS

FIG. 3 is an operational truth table relating the states of components and data lines in the embodiment of FIG. 1.

FIGS. 6-21 are mask charts useful for programming the memory of FIG. 4.

DETAILED DESCRIPTION OF THE INVENTION

Figure 1:
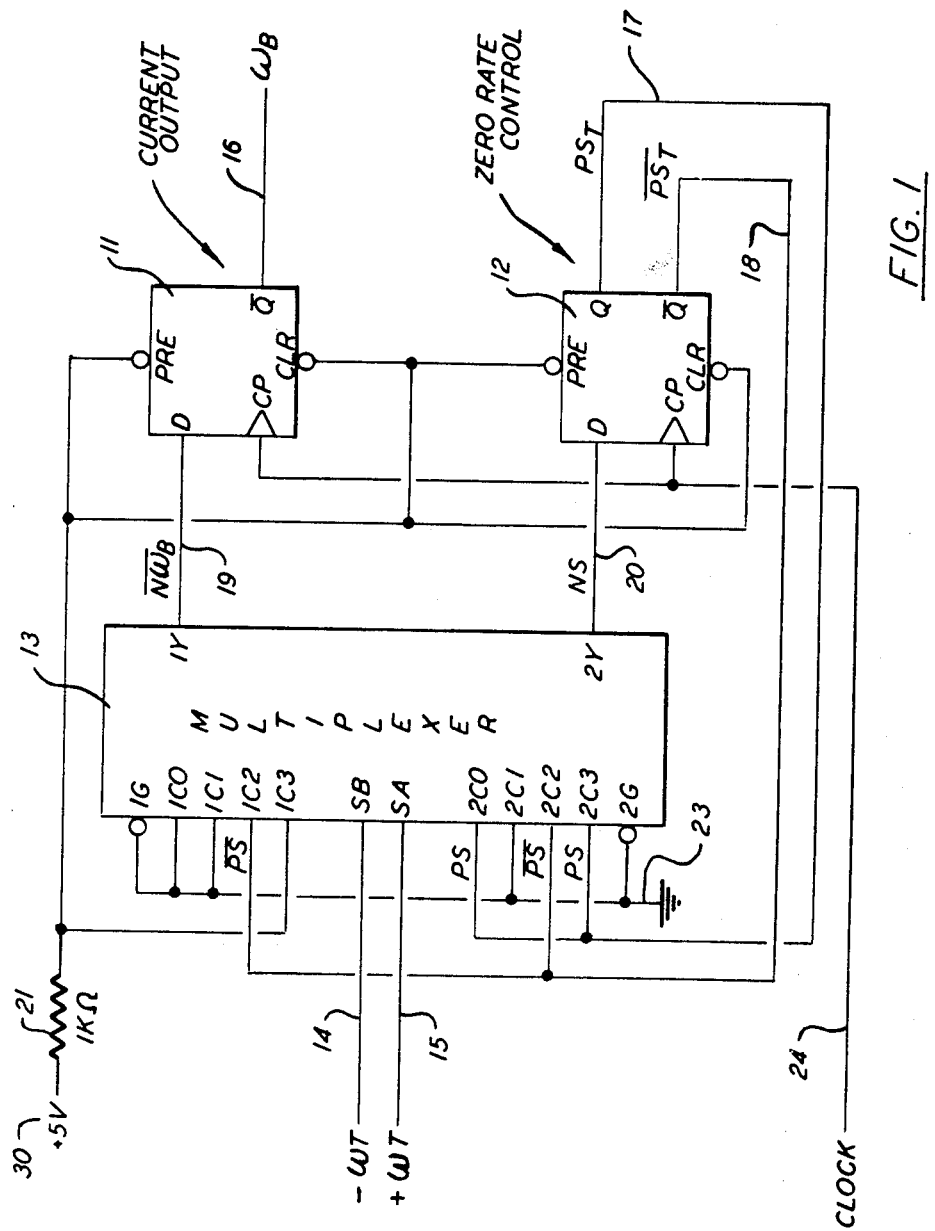
FIG. 1 is a block diagram of a preferred embodiment of a ternary to binary converter according to the teachings of the invention.
Figure 2:
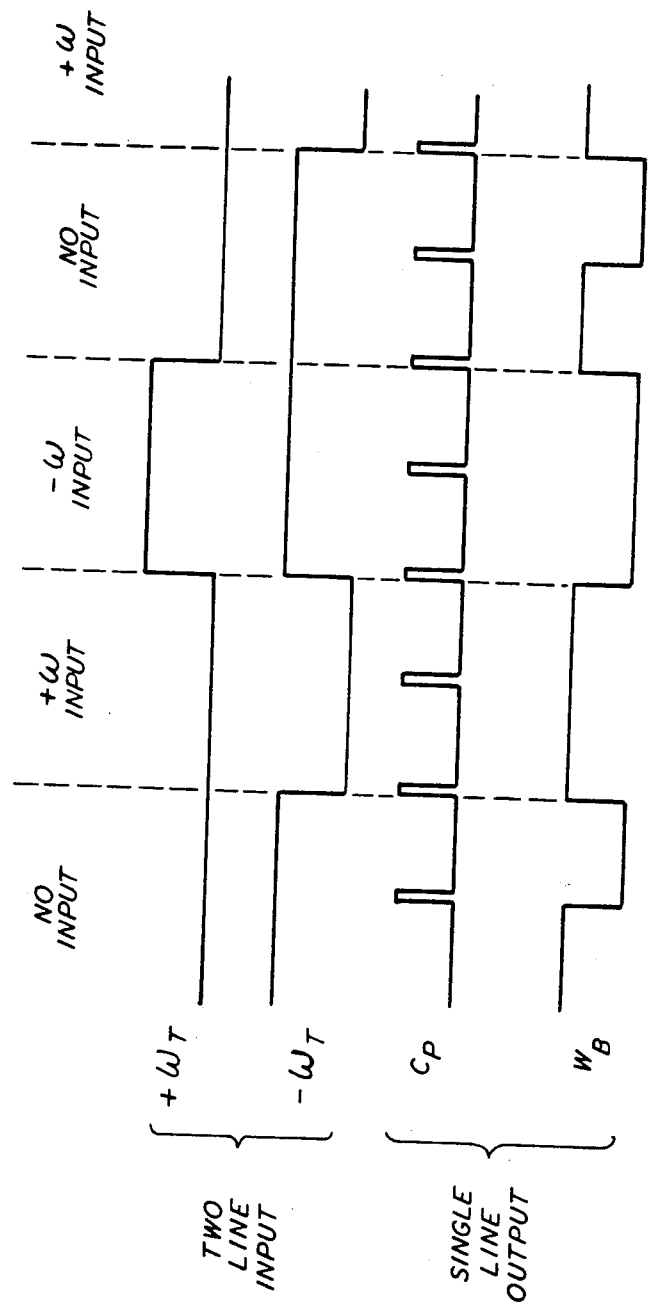
FIG. 2 is a diagram of some key wave forms in the circuit of FIG. 1.

The circuit shown in FIG. 1 is a ternary to binary converter system which receives ternary inputs $+\omega_T$ and $-\omega_T$ in binary code on input lines 14 and 15, respectively, and delivers the desired binary output $\omega_B$ on output line 16. As shown in FIG. 2, the signal $+\omega_T$ indicates a change in input condition by a positive going voltage pulse corresponding to a change of logic from "0" to "1". Similarly, the line $-\omega_T$ indicates a change in condition by going from an initial logic "1" to a logic "0" corresponding to a positive voltage going to zero volts. Conventional digital notation is used in this specification with "1" indicating the presence of a positive voltage level, in this case approximately 5 volts, as well as indicating the logic state in the Boolean notation. Similarly, "0" signifies zero voltage level or ground, as well as the logic state "0". The relation between the input and output waveforms is shown in FIG. 2, where the inputs $-\omega_T$ and $+\omega_T$ are shown in relation to the synchronous clock pulse train and to the output waveform $\omega_B$ for the three possible input conditions: no input, $+\omega$, and $-\omega$. In the first condition shown, no input, $+\omega_T$ is at 0, $-\omega_T$ is at 1 and the output $\omega_B$ is a square wave having a 50% duty cycle which alternates between a high state or 1 and a low state or 0. Each half cycle of the square wave is triggered by the leading edge of the clock pulse $C_p$. In this condition, the converter output $\omega_B$ is said to be zero-rating.

When there is a $+\omega$ or a $-\omega$ input condition, the converter system momentarily suspends its zero-rate output condition by injecting one extra output state, of a value specified by the inputs, into the chain of output states. After delivering this extra pulse or state, the converter system returns to the normal zero-rate output, picking up as though no zero-rate outputs had been missed. If the input condition persists for more than one clock period, then the system continues to deliver the same output voltage, or value, so long as the input condition lasts. Thus, when the input returns to the no input condition, the output $\omega_B$ resumes its zero-rate output train in normal sequence; i.e., as though no zero-rate output states had been missed.

Two types of electronic component are used in the converter. The first is a dual, D-type positive edge triggered flip-flop, one section of which serves as binary output flip-flop 11 and the other section as zero-rate control flip-flop 12. This component may be of the kind generically known as type 5474. Output flip-flop 11 maintains the state of the current output while the condition of the next output is being determined in the logic circuitry. The current, or present, state of control flip-flop 12 determines the polarity of the next normal zero rate output. This flip-flop oscillates in response to the clock line when the inputs $\omega_T$ are in the no input state. It remains in its current condition when other ternary input is present.

The second component used in the converter is a dual 4-line to 1-line data selector or multiplexer 13, which may be of the generic type 54153; it is used to determine the next required output state of output flip-flop 11 based upon the current states of control flip-flop 12 and multiplexer input lines 14 and 15, in accordance with the particular case shown in FIG. 2, and to determine whether control flip-flop 12 shall oscillate in response to the clock, based on the combination of its own condition and the conditions of the input lines 14 and 15.

The terminals of flip-flops 11 and 12 are connected as follows. A positive pull-up voltage derived from a +5 volt supply (not shown) is supplied through 1000 ohm biasing resistor 21 to the preset and clear terminals, PRE and CLR, respectively, of both devices where it is used as a bias that decreases noise sensitivity of inputs which play no active part in the logical operation of the device. Clock pulses, supplied by clock pulse line 24, are applied simultaneously to clock pulse terminals CP of each flip-flop. Each flip-flop has complementary output terminals. The "not", or complementary, output $\overline{Q}$ of output flip-flop 11 supplies system output line 16 with the converter output $\omega_B$. The output Q and its complementary output $\overline{Q}$ of control flip-flop 12 convey present state $PS_T$ and "not", or complementary present state $\overline{PS_T}$, information via input lines 17 and 18 to terminals 2C0, 2C3 and 1C2, 2C2, respectively, of multiplexer 20. Input or drive terminals D of the output flip-flop 11 and of the control flip-flop 12 are supplied, in the first case, with information $\overline{N\omega_B}$ as to the complement of the next state of output flip-flop 11 and, in the second case, with next state information NS for control flip-flop 12. Lines 19 and 20 connect multiplexer 13 to flip-flops 11 and 12, respectively, for this purpose.

The terminals of multiplexer 13 are connected as follows. As has already been stated, the input signals $-\omega_T$ and $+\omega_T$ are fed to inputs SB and SA, respectively; output signals $\overline{N\omega_B}$ and NS are conveyed from multiplexer output terminals 1Y and 2Y to the flip-flops 11 and 12, respectively. The pull-up voltage derived from the 5 volt supply and resistor 21 is supplied to terminal 1C3 of multiplexer 13 via connecting line 22. Line 23 connects multiplexer terminals 1G, 1C0, 1C1, 2C1 and 2G to ground. Terminals 1C2, 2C2, 2C0, and 2C3 are supplied by flip-flop 12 as described above.

Multiplexer 13 has two sections, each capable of connecting any one of four input lines to one output line in accordance with conditions at the two control input terminals SA and SB. Both sections switch at once (in parallel). Thus, if "no input" ternary conditions prevail, ($-\omega_T=1$ and $+\omega_T=0$), the multiplexer connects input terminals 1C2 and 2C2 to output terminals 1Y and 2Y, respectively. Similarly, for the "high" condition ($-\omega_T=0$ and $+\omega_T=0$), it will connect 1C0 and 2C0 to the outputs and, for the "low" ternary condition ($-\omega_T=1$ and $+\omega_T=1$), it will choose 1C3 and 2C3.

FIG. 3 shows possible switching conditions in the system; that is, for each possible combination of $+\omega_T$ and $-\omega_T$ logic signals shown in the two left hand columns, one voltage from each set of voltages present on each group of multiplexer input terminals 1C0, 1C1, 1C2, 1C3 and 2C0, 2C1, 2C2, 2C3 is chosen and appears at the outputs $y_1$ and $y_2$, respectively. (Those terminals sharing the same input connection and, therefore, the same signal, are listed in the same column in FIG. 3.) Thus, if there is a signal (logic 1) on $-\omega_T$ and no signal (logic 0) on $+\omega_T$, corresponding to the "no input" ternary condition, and a zero voltage condition on line 18, $\overline{PS_T}$, a clock pulse will generate a plus output, $\omega_B=1$, on output terminal Q of flip-flop 11. This occurs because multiplexer output 19 is supplying zero voltage, $\overline{NW_B}=0$, at the time of the clock pulse and the $\overline{Q}$ output of flip-flop 11 is therefore made positive.

At the same time, control flip-flop 12, which has been transmitting 1 on $PS_T$ and 0 on $\overline{PS_T}$, is triggered by the clock pulse and reverses its outputs, giving $PS_{T+1}=0$ and $\overline{PS_{T+1}}=1$. This results in the output $\overline{NW_B}$ of multiplexer 13 becoming 1. Upon the next clock pulse, T+1, therefore, the output 16 of current flip-flop 11 becomes 0. So long as $-\omega_T$ and $+\omega_T$ remain 1 and 0, respectively, the zero-rate established according to the above process recycles itself with each second clock pulse. Since the clock pulses are equally spaced, a 50% duty cycle square wave results, as will be understood by those skilled in the art.

A second set of operating conditions may be established by changing one of the input voltages $\omega_T$. Thus if $-\omega_T$ is made 0, as in the $+\omega$ input column of FIG. 2 and on the third and fourth lines of FIG. 3, the multiplexer will switch to the C0 inputs, sending $\overline{N\omega_B}=0$ to flip-flop 11. This causes the output of flip-flop 11 to become $\omega_B=1$ on the next clock pulse, and NS, at that time, sets the outputs of flip-flop 12 to $PS_{T+1}=1$ and $\overline{PS_{T+1}}=0$. This condition persists so long as $-\omega_T=0$ and $+\omega_T=0$; since the $PS_T$ and $\overline{PS_T}$ signals remain 1 and 0, respectively, the output on line 16 remains $\omega_B=1$ through successive clock pulses until the input condition changes.

Operation of the circuit for the third, or low, input condition is typified by the $-\omega$ input portion of FIG. 2 and by lines 5 and 6 of FIG. 3.

Under this condition, both $+\omega_T$ and $-\omega_T$ are 1. In the preceding condition, e.g., both inputs=0 as described above, $PS_{T+1}$ was 1 and $\overline{PS_{T+1}}$ was 0, the same state as shown in line 5 of FIG. 3. From the table, it is seen that the multiplexer, selecting the 1C3 and 2C3 inputs, gives outputs NS=1 and $\overline{N\omega_B}=1$. After the next clock pulse the flip-flop outputs will be $\omega_B=0$, $PS_{T+1}=1$ and $\overline{PS_{T+1}}=0$. Since $\overline{PS_T}$ thus remains 1, the output $\omega_B$ will be 0 so long as the input remains unchanged.

Figures 4, 5:
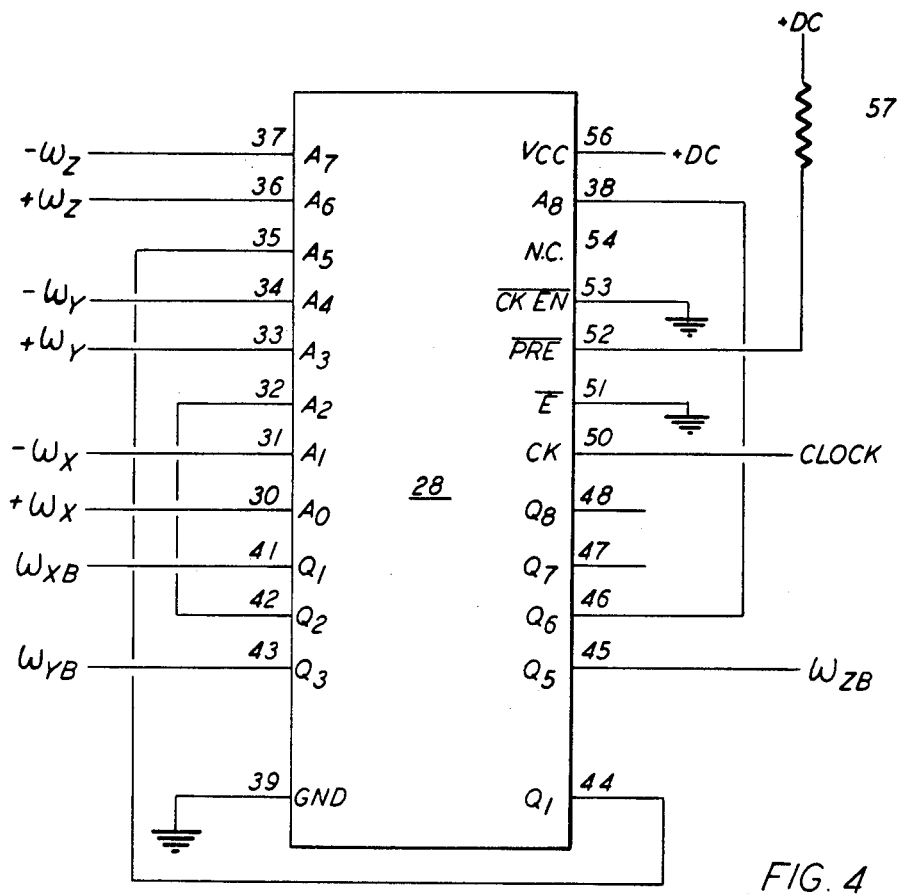
FIG. 4 is a block diagram of an embodiment of the invention using a read only memory.
FIG. 5 is an operational truth table relating to the states and data lines of the embodiment of FIG. 4.

FIG. 4 is a schematic representation of a programmable read only memory, here shown as the type 53RA481 which holds 512, 8 bit wide words; this circuit is capable of handling ternary inputs from a number of lines or channels simultaneously. Thus, not only can the read only memory (ROM) receive inputs at a pair of terminals 30 and 31, representing $+\omega_x$ and $-\omega_x$ data, but it is also capable, on input terminal pairs 33 and 34, and 36 and 37, of receiving ternary information from another set of lines $+\omega_y$ and $-\omega_y$ and $+\omega_z$ and $-\omega_z$, respectively.

The particular read only memory employed includes an output register and has tristate outputs. Provision is made for operating the ROM in a continuous mode by means of the following connections. The "not enable" terminal 51 is grounded to insure that the tristate gating and output drive are enabled at all times. Similarly, "not clock enable" terminal 53 is grounded so that a clock signal applied to terminal 50 will be effective to drive the memory at all times. Finally, a positive voltage is supplied to "not preset" terminal 52 from the 5 volt power supply via bias resistor 57, insuring operation at all times.

The ROM is connected as follows. Three binary encoded ternary signal outputs $\omega_{xB}$, $\omega_{yB}$ and $\omega_{zB}$ are derived from terminals 41, 43, and 45, respectively. Output signals from ROM output terminals 42, 44, and 46, are connected to address terminals 32, 35, and 38, respectively. These connections supply a signal to each address terminal indicating the present state of the output signal and so correspond to the "present" state signals of the circuit disclosed in FIG. 1. Input signals $+\omega_x$ and $-\omega_x$, $+\omega_y$ and $-\omega_y$, and $+\omega_z$ and $-\omega_z$ are supplied on ternary input lines connected to address terminals 30 and 31, 32 and 33, and 34 and 35, respectively.

Operation of the circuit may be understood by reference to FIGS. 5 and FIGS. 6 through 21. The read only memory 28 is pre-programmed during manufacture in accordance with the mask charts laid out in FIGS. 6 to 21, inclusive. As will be seen, each horizontal line of the mask represents the set of output data to be transmitted at terminals $Q_1$ through $Q_6$ in response to a particular address applied at terminals $A_0$ through $A_8$. The data for each input or output terminal is stated in binary form. In the illustrative embodiment of FIG. 5, the three ternary signal levels being received are arbitrarily coded as $+\omega_T = 00$, zero signal = 10, and $-\omega_T = 01$. These same input signals are used for the X-axis, the Y-axis, and Z-axis signals and are shown for the X-axis related signals in truth table form in FIG. 5. There, the three ternary conditions are shown in the vertical columns with their inputs $+\omega_X$ and $-\omega_x$ and present state output $Q_2(A_2)$ and serial, binary coded ternary output, $\omega_{xB}$, being shown on the indicated, horizontal lines.

For the sake of simplicity, operation of the device will be explained in connection with the $\omega_x$ signals which may be interpreted by reference to the upper right hand corner of ROM mask of FIG. 6.

Referring to FIG. 6, if a positive ternary input $+\omega_T$, consisting of zero voltage $+\omega_x$ and $-\omega_x$ signals, is applied to input lines 30 and 31, respectively, and it is assumed that the input 32 (to ROM terminal $A_2$) from the register output terminal 42 is 0, the memory mask chart is entered on the first line. Then, the output signal $\omega_{xB}$ on line 41 ($Q_1$) is a 1 (a positive voltage) and the "present" state signal on terminal 32 ($Q_2$) remains 0. Then, so long as successive $+\omega_T$ inputs are received clock pulses, the output of the memory at succeeding clock pulses will be the same because the same address input conditions prevail.

If the input signal should switch to the "no input" ternary condition, the input signal $\omega_x$ will be a 1 and the input signal $-\omega_x$ will be a 0. Since the input to address terminal $A_2$ remains 0, on the next clock pulse, line 2 has been addressed and the output $\omega_{xB} = 0$ is now read on terminal 41 ($Q_1$). At the same time, the output at terminal 42 ($Q_2$) becomes 1, and the system is prepared to operate in another part of the table, namely, at the address shown 7 lines from the top. If, now, the no input ternary condition continues, that is if $\omega_x = 1$ and $-\omega_x = 0$, the next clock pulse will cause the output on line 7 to be read, giving an output $\omega_{xB}$ at terminal 41 ($Q_1$) of 1 and a "present" state output at terminal 42 of 0 preparing for response again on the top part of the table. So long as the no input ternary condition prevails, the output signal on $\omega_{xB}$ oscillates between the 1 and 0 condition on each clock pulse, being controlled by the alternating "present" output on terminal 42 ($Q_2$).

If the "present" condition $Q_2$ of the memory is again assumed to be a 0 and if the input ternary condition becomes $-\omega_T$, the signal applied to terminals 30 and 31 ($A_0$ and $A_1$) is 0 and 1, respectively, and line 3 of the ROM mask is selected. The output signal $\omega_{xB}$ at terminal 41 ($Q_1$) is zero and the present state signal is 0, transmitted from terminal 42 ($Q_2$) to address terminal 32 ($A_2$). If, on the other hand, the "present" condition of the system is signalled as a 1 at the time the $-\omega_{xT}$ input is received, line 8 of the random access memory is addressed and it will be seen that the output $\omega_{xB}$ is 0 again.

It will be apparent from the drawings that certain combinations of input will produce no output. In this case, if a positive signal is received on both input lines $+\omega_{xT}$ and $-\omega_{xT}$, there will be no output produced, this being an arbitrarily disallowed condition for the ternary code in use. Since the choice of codes is arbitrary, it will be understood by those skilled in the art that other signal combinations, such as 11, 10 and 01 can be used to represent the ternary input conditions. Also, the above illustration of the way in which a ROM can be used for the conversion of ternary signals on two lines into serial coded binary signals on one line will suggest other ways of using programmable or pre-programmed memories for the same or like purposes to those skilled in the art.

The reminder of the ROM is programmed to handle the balance of the possible combinations of input signals appearing simultaneously on three ternary input channels represented by $+\omega_x$ and $-\omega_x$, $+\omega_y$ and $-\omega_y$, and $+\omega_z$ and $-\omega_z$. It will be understood by those skilled in the art that the operation of other sections of the ROM is a logical extension of the operation already explained in connection with the single signal input on the X-axis.

It will be understood by those skilled in the art that a transmission line, a line, or a transmission circuit, as described above, may consist of a pair of wires or of a wire and ground. Two transmission lines, then, may consist, for example, of two pairs of wires, or of two wires and a common wire or of two wires and a ground connection which is common to the wires.

Two ways have been described above for converting information coded as a ternary combination of binary states on two transmission lines into serial codes binary information for transmission on one transmission line using particular circuits and components. Other ways of achieving the same result by application of the teachings of the invention will suggest themselves to those skilled in the art. The following claims should therefore be interpreted in keeping with the spirit of the invention rather than limited to the specific embodiments described above.

What is claimed is:

1. A circuit for converting ternary information coded as first and second binary input signals in which a first binary state on one signal and second state on the other signal represent no input, a first binary state on the one and a first binary state on the other represent a positive input and second binary state on one and a second binary state on the other a negative input, into an output signal which, when alternating between two binary states, represents no input, when at a first binary state represents a positive input and when at a second binary state represents a negative input, comprising:

(a) means generating a clock signal synchronous with said first and second input signals;

(b) a multiplexer having as first and second inputs said first and second binary input signals, and providing said first and second signals to first and second outputs, said multiplexer also having control inputs operative to selectively couple said first and second inputs to said first and second outputs;

(c) a first D-type flip flop having said clock signal as a clock input and said first output as a data input and providing said output signal at its output; and (d) a second D-type flip flop having said clock signal as a clock input and said second output as a data input and providing its outputs to said control inputs of said multiplexer.

2. The ternary to binary converting circuit of claim 1 in which the second flip-flop provides present state and complement of present state information, and the multiplexer chooses and supplies to the first flip-flop either 0, complement of present state, or 1 information, and to the second flip-flop either 0, complement of present state, or present state information, respectively.

3. A circuit for converting ternary information coded as first and second binary input signals in which a first binary state on one signal and second state on the other signal represent no input, a first binary state on the one and a first binary state on the other represent a positive input and second binary state on one and a second binary state on the other a negative input, into an output signal which, when alternating between two binary states, represents no input, when at a first binary state represents a positive input and when at a second binary state represents a negative input, comprising:

(a) means generating a clock signal synchronous with said first and second input signals; and (b) a memory having at least six word locations, addressable by means of three input terminals, for storing binary signals accessible on two output terminals, said memory being programmed to select and provide an output signal on one output terminal in accordance with said first and second signals applied to two input terminals and a present state of the output signal coupled to the third input terminal from the second output terminal, said memory also having a clock input coupled to said clock signal and providing said output synchronously therewith.

4. The circuit of claim 3 comprising a memory having at least two hundred sixteen word locations, addressable by combinational signals on nine input terminals, for storing binary signals accessible on six output terminals, the memory being programmed to select and provide an output signal on each one of three output terminals in accordance with the input signals on a given pair of input terminals and with a corresponding state of the output signal transmitted to a third, associated input terminal from one of the remaining three output terminals.

5. The circuit of claim 4 in which there are n pairs of input lines, n output lines, 6n! memory locations, and n present state conditions.

* * * * *